United States Patent
Wantland et al.

(10) Patent No.: US 12,387,719 B2
(45) Date of Patent: *Aug. 12, 2025

(54) SYSTEMS AND METHODS FOR IDENTIFYING AND PROVIDING INFORMATION ABOUT SEMANTIC ENTITIES IN AUDIO SIGNALS

(71) Applicant: Google LLC, Mountain View, CA (US)

(72) Inventors: Tim Wantland, Bellevue, WA (US); Brandon Barbello, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/303,869

(22) Filed: Apr. 20, 2023

(65) Prior Publication Data
US 2023/0252981 A1  Aug. 10, 2023

Related U.S. Application Data

(63) Continuation of application No. 17/047,472, filed as application No. PCT/US2018/044294 on Jul. 30, 2018, now Pat. No. 11,664,017.

(51) Int. Cl.
G10L 15/22  (2006.01)
G06F 3/01  (2006.01)
(Continued)

(52) U.S. Cl.
CPC .......... *G10L 15/1815* (2013.01); *G06F 3/017* (2013.01); *G06F 3/0481* (2013.01);
(Continued)

(58) Field of Classification Search
USPC ............... 704/257, 246, 247, 251, 252, 275
See application file for complete search history.

(56) References Cited

U.S. PATENT DOCUMENTS 9,484,030 B1 * 11/2016 Meaney ................ H04R 3/005
2008/0313570 A1 * 12/2008 Shamma ................ G11B 27/34
715/846

(Continued)

OTHER PUBLICATIONS

Argal et al, "Intelligent Travel Chatbot for Predictive Recommendation in Echo Platform", Computing and Communication Workshop and Conference, 2018, 8 pages.

(Continued)

*Primary Examiner* — Leonard Saint-Cyr
(74) *Attorney, Agent, or Firm* — DORITY & MANNING, P.A.

(57) ABSTRACT

Systems and methods for determining identifying semantic entities in audio signals are provided. A method can include obtaining, by a computing device comprising one or more processors and one or more memory devices, an audio signal concurrently heard by a user. The method can further include analyzing, by a machine-learned model stored on the computing device, at least a portion of the audio signal in a background of the computing device to determine one or more semantic entities. The method can further include displaying the one or more semantic entities on a display screen of the computing device.

20 Claims, 10 Drawing Sheets

(51) Int. Cl.
*G06F 3/0481* (2022.01)
*G06F 3/16* (2006.01)
*G06F 16/683* (2019.01)
*G06N 20/00* (2019.01)
*G10L 15/18* (2013.01)
*G10L 15/30* (2013.01)
*H04R 1/08* (2006.01)
*H04R 1/10* (2006.01)

(52) U.S. Cl.
CPC ............ *G06F 3/167* (2013.01); *G06F 16/685* (2019.01); *G06N 20/00* (2019.01); *G10L 15/22* (2013.01); *G10L 15/30* (2013.01); *H04R 1/08* (2013.01); *H04R 1/1016* (2013.01)

(56) References Cited

U.S. PATENT DOCUMENTS

| | | | | |
|---|---|---|---|---|
| 2010/0195975 | A1* | 8/2010 | Issa | H04N 21/84 386/E5.052 |
| 2013/0125188 | A1* | 5/2013 | Mandalia | H04N 21/4333 386/E5.028 |
| 2013/0297321 | A1 | 11/2013 | Raux et al. | |
| 2014/0088952 | A1 | 3/2014 | Fife et al. | |
| 2014/0142953 | A1 | 5/2014 | Kim et al. | |
| 2015/0162000 | A1 | 6/2015 | Di Censo et al. | |
| 2016/0284351 | A1 | 9/2016 | Ha et al. | |
| 2017/0228240 | A1 | 8/2017 | Khan et al. | |
| 2018/0032612 | A1 | 2/2018 | Kariman | |
| 2020/0275207 | A1 | 8/2020 | Zilberman et al. | |

OTHER PUBLICATIONS

"Intelligent Personal Assistants", https://www.citiusminds.com/blog/wp-content/uploads/2017/03/War_Intelligent_Personal_Assistant, 24 pages.

International Preliminary Report on Patentability for PCT/US2018/044294, mailed on Feb. 11, 2021, 8 pages.

International Search Report for PCT/US2018/044294, mailed on Nov. 2, 2018, 3 pages.

* cited by examiner

SYSTEMS AND METHODS FOR IDENTIFYING AND PROVIDING INFORMATION ABOUT SEMANTIC ENTITIES IN AUDIO SIGNALS

PRIORITY CLAIM

This application claims priority to and the benefit as a continuation of U.S. application Ser. No. 17/047,472, filed on Oct. 14, 2020. U.S. application Ser. No. 17/047,472 is hereby incorporated by reference herein in its entirety. U.S. application Ser. No. 17/047,472 claims priority to and the benefit as a national stage entry under 35 U.S.C. § 371 of International Application No. PCT/US2018/044294, filed on Jul. 30, 2018. International Application No. PCT/US2018/044294 is hereby incorporated by reference herein in its entirety.

FIELD

The present disclosure relates generally to systems and methods for identifying semantic entities in audio signals. More particularly, the present disclosure relates to systems and methods that leverage machine-learning operating in a background of a computing device to identify semantic entities in a variety of audio signals heard by a user, display the semantic entities to the user, and provide supplemental information to the user regarding selected semantic entities.

BACKGROUND

Mobile computing devices, such as smartphones, have provided the ability to listen to audio based content on demand and across a wide variety of platforms and applications. For example, a person can listen to music and movies stored locally on their smartphones; stream movies, music, television shows, podcasts, and other content from a multitude of complimentary and subscription-based services; access multimedia content available on the internet; etc. Further, mobile computing devices can allow people to verbally communicate with one another in a variety of ways, such as telephone calls, video calls, and audio/video messages sent via MMS. Some mobile computing devices can even be used to provide translation services, such as during an in-person conversation between speakers of two different languages.

Thus, people may hear about certain topics of interest while using their mobile computing devices in a variety of environments and situations. However, while a particular topic may be of interest to someone, often times a person may not be in a position to interrupt a task they are performing to look up supplemental information on the particular topic.

SUMMARY

Aspects and advantages of the present disclosure will be set forth in part in the following description, or may be obvious from the description, or may be learned through practice of embodiments of the present disclosure.

One example aspect of the present disclosure is directed to a method for identifying semantic entities within an audio signal. The method can include obtaining, by a computing device comprising one or more processors and one or more memory devices, an audio signal concurrently heard by a user. The method can further include analyzing, by a machine-learned model stored on the computing device, at least a portion of the audio signal in a background of the computing device to determine one or more semantic entities. The method can further include displaying the one or more semantic entities on a display screen of the computing device.

Another example aspect of the present disclosure is directed to a device for identifying semantic entities within an audio signal. The device can include one or more processors and a display screen. The one or more processors can be configured to obtain an audio signal. The one or more processors can further be configured to receive a user request to identify one or more semantic entities within a portion of the audio signal. The one or more processors can further be configured to analyze, by a machine-learned model, the portion of the audio signal to determine one or more semantic entities within the portion. The one or more processors can further be configured to operate the display screen to display the one or more semantic entities.

Another example aspect of the present disclosure is directed to a system for identifying semantic entities within an audio signal. The system can include a computing device. The computing device can include one or more processors and a display screen. The system can further include a speaker device configured to play one or more audio signals for a user. The speaker device can further be configured to receive one or more user interactions from the user. The speaker device can be operable to receive a user interaction indicative of a user request. Responsive to receiving the user interaction, the speaker device can further be operable to communicate the user request to the computing device. The computing device can be operable to receive the user request. Responsive to receiving the user request, the computing device can further be operable to analyze a first portion of a first audio signal with a machine-learned model to identify one or more semantic entities. The computing device can further be operable to display the one or more semantic entities on the display screen.

Other aspects of the present disclosure are directed to various systems, apparatuses, non-transitory computer-readable media, user interfaces, and electronic devices.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
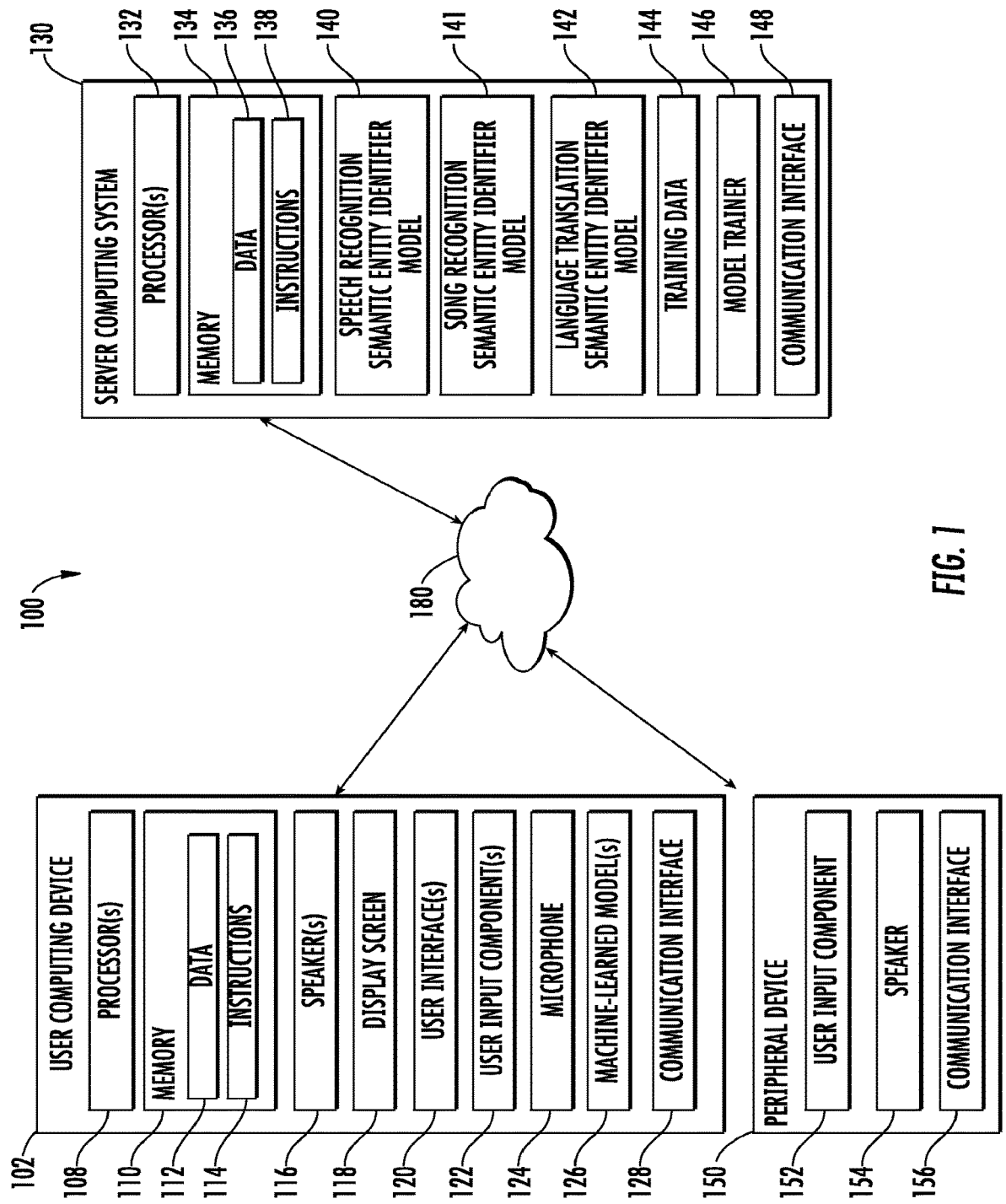
FIG. 1 depicts a block diagram of an example system for identifying semantic entities within an audio signal according to example aspects of the present disclosure.

Generally, the present disclosure is directed to systems and methods which can operate in a background of a computing device to automatically recognize and present semantic entities that a user hears in a variety of audio signals, and further, to provide supplemental information to the user regarding semantic entities of interest. For example, the systems and methods of the present disclosure can be implemented on a computing device, such as a user's smartphone, in an always-on operating mode in a background of the computing device to identify semantic entities that a user hears from a variety of audio signals, such as media files playing on the computing device, in-person conversations or other audio the user overhears in his/her environment, telephone conversations, etc. Further, semantic entities can be presented to the user in a subtle way that allows the user to access supplemental information about the semantic entities, such as contextual supplemental information. For example, a person listening to a podcast on their smartphone may be interested in learning more about a particular writer discussed in the podcast. Similarly, a person having a conversation with a tour guide speaking a foreign language may be interested in learning more about a particular tourist attraction discussed by the tour guide. As another example, a person having a telephone conversation with a friend may be curious to see what is on the menu of a restaurant recommended by her friend. The systems and methods of the present disclosure can identify various semantic entities (e.g., people, places, locations, etc.) within an audio signal heard by the user, and display the semantic entities to the user, such as via a user interface displayed on a computing device. Further, the user can select a particular semantic entity, such as through a user interface for an application being executed on the computing device, to access supplemental information about the selected semantic entity.

More particularly, the systems and methods of the present disclosure can allow for a computing device to obtain an audio signal concurrently heard by a user. For example, the audio signal can include media playing on the computing device, a communication signal communicated to the computing device (e.g., a telephone call), ambient audio received by the computing device, such as a conversation between a user and a third person, and/or other audio signals. A machine-learned model stored on the computing device can then analyze at least a portion of the audio signal to determine one or more semantic entities. For example, a speech recognition machine-learned model can be trained to recognize various people, places, things, dates/times, events, or other semantic entities in audio signals which include speech. The analysis of the audio signal can be performed in a background of the computing device. As used herein, the phrase "in a background" when used in reference to analyzing an audio signal on a computing device means concurrently with another task being performed on the computing device or while the computing device is in an idle state. For example, the audio associated with a movie a user is watching on his/her smartphone can be analyzed while the movie is being played.

Further, the computing device can then display the one or more semantic entities, such as on a display screen of the computing device. For example, in various implementations, the one or more semantic entities can be displayed in a variety of ways, such as by displaying text, icons, pictures, etc. which are indicative of the semantic entities, and can be displayed in list format or via application-specific user interfaces. In some implementations, the user can select a semantic entity displayed on the display screen, and the computing device can display one or more supplemental information options associated with the selected semantic entity. For example, supplemental information options can include database entries (e.g., webref entries, Wikipedia entries, etc.), search engine results (e.g., Google search results, etc.), and/or application interaction options (e.g., restaurant review applications, reservation applications, event ticket purchase applications, etc.), and can be selected based on a context of the audio signal and/or a context of the semantic entity. In this way, one or more semantic entities in audio signals which may be of potential interest can be automatically identified and displayed to a user, and supplemental information can be provided to the user about particular semantic entities when the user chooses to access such supplemental information.

According to example aspects of the present disclosure, a computing device (e.g., a smartphone) can include one or more processors and one or more memory devices, and can be configured to store one or more machine-learned models. The computing device can further be configured to obtain various audio signals concurrently heard by a user. For example, in some implementations, the computing device can be configured to execute various applications which have associated audio signals. In some implementations, the audio signals can be played via an application being executed on the computing device, such as in an internet browser application window, a music application, a movie application, a telephone call application, a speech to text dictation application, etc. For example, the computing device can be configured to play various media file formats, such as audiovisual files (.wmv, .avi, .mov, .mpeg, .flv, etc.), compressed or uncompressed audio files (.wav, .mp3, .wma, .aac, .m4a, etc.) and/or other types of media files. The term "obtain" as used herein with respect to such media files includes accessing an audio signal associated with such a media file, such as when the media file is played on the computing device or communicated to an associated peripheral device. In some implementations, an audio signal can be obtained by the audio signal being communicated to the computing device, such as via one or more communication networks. For example, in some implementations, a computing device (e.g., a smartphone) can be configured to receive various audio signals communicated to the computing device, such as audio signals communicated over cellular telephone networks (e.g., CDMA, GSM, LTE, etc.), wireless networks (WLAN, Bluetooth, BLE, etc.), radio networks (e.g., AM, FM, etc.) or other communication networks. In some implementations, the computing device can be configured to receive various ambient audio signals, such as when a user has authorized the computing device to capture ambient audio signals, such as human speech from a conversation, via a microphone of the computing device. For example, the user's smartphone can be configured in an "always-on" mode in which a microphone of the smartphone generates an audio signal based on ambient audio concurrently heard by the user, which can be analyzed in a background of the smartphone to identify semantic entities in the audio signal.

Thus, in some implementations, in order to obtain the benefits of the techniques described herein, the user may be required to allow the collection and analysis of audio signals by his or her computing device. For example, in some implementations, users may be provided with an opportunity to control whether programs or features collect such audio signals. If the user does not allow collection and use of such audio signals, then the user may not receive the benefits of the techniques described herein. The user can also be provided with tools to revoke or modify consent. In addition, certain information or data can be treated in one or more ways before it is stored or used, so that user information is protected. As an example, a computing device can temporarily store such audio signals in an audio buffer for analysis, and discard the audio signals following analysis.

A machine-learned model stored on the computing device can then be used to analyze at least a portion of the audio signal to determine one or more semantic entities. For example, in some implementations, a portion of an audio file, such as a rolling audio buffer, can be input into a machine-learned model trained to recognize various semantic entities. In some implementations, the machine-learned model can be a speech recognition semantic entity identifier model configured to recognize various semantic entities in human speech. In some implementations, the machine-learned model can be a language translation semantic entity identifier model trained to recognize and/or translate various semantic entities in a foreign language. In some implementations, the machine-learned model can be a song recognition semantic entity identifier model trained to recognize songs. The audio signal, or a portion thereof, can be input into the machine-learned model, and the one or more semantic entities can be received as an output of the machine-learned model. Further, the analysis of the audio signal can be performed in a background of the computing device, such as while the computing device is executing another task. For example, in implementations in which a user has provided appropriate authorization, an audio signal associated with a telephone call can be analyzed by a machine-learned model on a user's smartphone to identify semantic entities in the telephone conversation while the telephone conversation is occurring.

The one or more semantic entities can then be displayed on a display screen of the computing device. For example, in some implementations, the one or more semantic entities can be displayed in a user interface on the display screen. In some implementations, the one or more semantic entities can be displayed in a "lock screen," such as when the computing device is in a locked or idle mode. In some implementations, a plurality of semantic entities can be displayed, such as in a list in the order at which the semantic entities appeared in the audio signal. In some implementations, the one or more semantic entities can be displayed in a particular display field of a user interface, such as in a designated area of a user interface for an application running on the computing device. For example, during a telephone call, a semantic entity, such as text or an icon indicative of the semantic entity, can be displayed in a particular field of a user interface for the telephone call application being executed by the smartphone.

In some implementations, the one or more semantic entities can be logged and accessed by a user at a later time. For example, over the course of a day, the user may hear a variety of audio signals, such as telephone calls, songs, and/or in-person conversations, each of which may have associated semantic entities which can be identified in the respective audio signals by the user's computing device. In some implementations, semantic entities identified in such audio signals can be logged (e.g., data indicative of the semantic entities can be stored locally on the computing device) to be accessed at a later time. For example, in one implementation, a user can access previously identified semantic entities via a "clipboard," which can be user interface displayed on the computing device wherein semantic entities which have been previously identified, such as over the course of the day, are displayed for the user's review.

In some implementations, the audio signal can be a streaming audio signal, such as an audio signal of an ongoing conversation and/or a playing media file. As the streaming audio signal is obtained by the computing device, the streaming audio signal, or a portion thereof, can be analyzed by the machine-learned model on a rolling basis to identify a plurality of semantic entities. For example, a plurality of consecutive portions of the audio signal can be analyzed to identify the plurality of semantic entities. Similarly, in some implementations, a plurality of semantic entities may be identified in a single portion of an audio signal. In such situations, the plurality of semantic entities can be displayed on the display screen, such as displaying each respective semantic entity as the semantic entity is identified and/or in an order at which the plurality of semantic entities are identified. For example, in some implementations, an audio signal associated with a podcast playing on a user's smartphone can be analyzed to identify a plurality of semantic entities, and each respective semantic entity can be displayed on the smartphone in response to being identified. In some implementations, each respective semantic entity can be displayed for a predetermined time period (e.g., five seconds). In some implementations, each respective semantic entity can be displayed in a particular field of a user interface of an application, such as a "live tile" in which each respective semantic entity (e.g., an icon) is displayed in response to being identified. In some implementations, a plurality of respective semantic entities can be displayed, such as in a list format. In some implementations, a plurality of the most recently identified semantic entities can be displayed, such as a rolling list of the three or four most recently identified semantic entities. In some implementations, the plurality of semantic entities can be displayed absent a request to display the plurality of semantic entities, such as on a lock screen of a user's smartphone.

In some implementations, the one or more semantic entities can be displayed in response to receiving a user request. For example, in some implementations, a user can request the computing device to display one or more semantic entities by performing a user interaction with the computing device or an associated peripheral device.

For example, in some implementations, the computing device can be communicatively coupled with an associated peripheral device. The associated peripheral device can be, for example, a speaker device, such as an earbud device coupled to the computing device via Bluetooth or other wireless connection. In some implementations, a user can perform a user interaction indicative of a user request with the associated peripheral device, and the associated peripheral device can communicate the user request to the computing device. For example, in some implementations, the user interaction can be a "fetch" gesture, such as a pulldown gesture, on an earbud device. In response to receiving the "fetch" gesture, the associated peripheral device (e.g., the earbud device) can communicate a user request to the computing device. In response to receiving the user request, the computing device can then display the one or more semantic entities on the display screen of the computing device.

In some implementations, the associated peripheral device, such as a speaker device (e.g., an earbud device) can also be configured to play one or more audio signals for the user. For example, the computing device can be operable to communicate audio signals to the speaker device, such as via a Bluetooth connection, and upon receiving the audio signal, the speaker device can audibly play the audio signal for the user. As the user listens to the audio signal played via the speaker device, the user can perform a user interaction with the speaker device in order to request the computing device display one or more semantic entities in the audio signal played by the speaker device. For example, according to example aspects of the present disclosure, a user can listen to a podcast (or other media) by streaming the podcast from the user's smartphone to a communicatively coupled earbud device, and upon hearing one or more interesting topics that the user would like to know more about, the user can perform a "fetch" gesture on the earbud device to request the smartphone display one or more semantic entities determined from the audio signal played on the earbud device.

In some implementations, the user request can be received by a user interaction with the computing device. For example, in some implementations, the display screen can be a touch-sensitive display screen configured to receive various user interactions by a user touching or performing various interactions with the display screen. For example, in some implementations, the user can perform a "swipe" gesture, such as touching a first part of the display screen and sliding their fingers along the display screen to a second part of the display screen, in order to request the one or more semantic entities be displayed on the display screen. For example, the computing device can be a user's smartphone in an idle or locked state while playing a media file, and the user can perform the "swipe" gesture on the display screen to request the one or more semantic entities be displayed. In response to receiving the user request, the computing device can display the one or more semantic entities.

Similarly, in some implementations, the user request can be received by a user accessing or executing an application on the computing device. For example, in some implementations, the one or more semantic entities can be logged and accessed by a user at a later time. For example, over the course of a day, the user may hear a variety of audio signals, such as telephone calls, songs, and/or in-person conversations, each of which may have associated semantic entities which have been identified in the respective audio signals by the user's computing device. In some implementations, semantic entities identified in such audio signals can be logged (e.g., data indicative of the semantic entities can be stored locally on the computing device) to be accessed at a later time. For example, in one implementation, a user can access previously identified semantic entities via a "clipboard," application which can be user interface displayed on the computing device wherein semantic entities which have been previously identified, such as over the course of the day, are displayed for the user's review. The user request can be, for example, an interaction with the computing device in which the user accesses or executes the "clipboard" application.

In some implementations, the user request can be received by other suitable means, such as by voice command, button push, other user interface interaction, or other interaction indicative of a user request. Further, in various implementations, the user request can be received by an associated peripheral device, such as an earbud device or other speaker device, and communicated to the computing device.

In some implementations, upon receiving the user request, the computing device can determine a selected portion of the audio signal for analysis based at least in part on a predetermined time period preceding receipt of the request from the user to display the one or more semantic entities. For example, in some implementations, the computing device can maintain a buffer in which an audio signal is temporarily stored as it is received (e.g., as a media file is played, as a communication signal is received, or as an ambient audio signal is obtained via a microphone). Upon receiving the user request, the computing device can determine a selected portion of the audio signal for analysis based on a predetermined time period preceding receipt of the request from the user. For example, a portion of the audio signal can be selected according to a time at which the user request is received. In some implementations, the portion of the audio signal can be a portion of the audio signal prior to the time at which the user request is received. For example, the 10-15 seconds of audio signal preceding receipt of the user request can be selected as the selected portion of the audio signal for analysis. In some implementations, the analysis of the audio signal can be performed in response to receiving the user request, such as by analyzing only the selected audio portion by the machine-learned model to determine the one or more semantic entities to display on the display screen. In other implementations, the entire audio signal can be analyzed, such as on a rolling or continuous basis, and in response to receiving the user request, the semantic entities which have been identified within the selected audio portion can be displayed on the display screen.

In some implementations, a user can select a selected semantic entity from the one or more semantic entities displayed on the display screen of the computing device. For example, in some implementations, a single semantic entity may be displayed at a time, and if a user performs a particular user interaction, such as touching the displayed semantic entity on a touch-sensitive display screen, the user can select the semantic entity. In other implementations, a plurality of semantic entities can be displayed, such as in a list, and the user may select a particular semantic entity from the list. In various implementations, the user selection can be received by, for example, voice command, button push, user interface interaction, or other interaction indicative of a user selection.

In response to receiving the user selection of the selected semantic entity, the computing device can determine one or more supplemental information options associated with the selected semantic entity. Further, the computing device can display the one or more supplemental information options associated with the selected semantic entity on the display screen of the computing device. In some implementations, the one or more supplemental information options can include database entries (e.g., webref entries, Wikipedia entries, etc.), search engine results (e.g., Google search results, etc.), and/or application interaction options (e.g., restaurant review applications, reservation applications, event ticket purchase applications, calendar applications, etc.).

In some implementations, the one or more supplemental information options can be determined based at least in part on the context of the audio signal obtained by the computing device and/or a context of the selected semantic entity. The context of the audio signal obtained by the computing device can be, for example, the type of audio signal obtained by the computing device and/or the manner in which it was obtained. The context of the selected semantic entity can be for example, a categorization of the selected semantic entity, such as whether it is a person, a place, (e.g., restaurants, venues, tourist locations, etc.), a thing (e.g., product), an event, a date and/or time, or other categorization.

For example, supplemental information options associated with a selected semantic entity may be different for a media file (e.g., podcast) playing on the computing device than for a selected semantic entity identified during a telephone conversation or ambient conversation between two or more people. For example, supplemental information options provided for a particular restaurant mentioned in a podcast might include search engine results (e.g., Google results), database entries (e.g., Wikipedia entries), and/or a link to the restaurant's website, whereas supplemental information options provided for the particular restaurant in the context of a telephone call or ambient conversation might include links to restaurant review websites, an option to open a restaurant reservation application, an option to add a calendar entry for a particular date and time, etc.

Similarly, supplemental information options associated with different types of selected semantic entities may be different. For example, supplemental information options for a book mentioned in a podcast could include a link to the author's website, one or more options to purchase the book online, directions to a nearby library, etc. whereas supplemental information options for a movie mentioned in a podcast could include a link to a trailer for the movie, an option to open a movie ticket purchase application, an option to access show times at a nearby theater, directions to a nearby theater, etc.

The systems and methods of the present disclosure can provide a number of technical effects and benefits. For example, the systems methods provided herein can allow for semantic entities within an audio signal concurrently heard by a user to be identified, either automatically or in response to a request from the user. Additionally, by leveraging one or more machine-learned models (e.g., neural networks), the systems and methods of the present disclosure can increase the computational efficiency and accuracy of semantic entity identification. For example, a machine-learned speech recognition semantic entity identifier model or a machine-learned language translation semantic entity identifier model can be implemented on a computing device, which can be trained to recognize semantic entities in a variety of audio signals. In this way, semantic entities in various languages and various audio signals can be determined in an efficient manner.

Further, the systems and methods of the present disclosure can display the one or more semantic entities identified in an audio signal to a user, thereby allowing the user to select a particular semantic entity of interest to the user. For example, one or more semantic entities identified in the audio signal can be displayed on a display screen of a computing device, wherein a user can select a particular semantic entity. Upon selecting a particular semantic entity, one or more supplemental information options associated with the selected semantic entity can be provided to the user. Moreover, the supplemental information provided to the user can be intelligently curated based on the context of the audio signal and/or the context of semantic entity selected by the user. Thus, the systems and methods of the present disclosure can allow a user to readily access a variety of supplemental information on a semantic entity of interest to the user in an efficient manner, thereby improving user experiences. Further, by analyzing the audio signals in the background of the computing device, the semantic entities can be identified and subtly presented to the user without interrupting any other tasks being performed by the computing device.

The systems and methods of the present disclosure also provide improvements to computing technology. In particular, a computing device can obtain an audio signal concurrently heard by a user and analyze, by a machine-learned model stored on the computing device, at least a portion of the audio signal in a background of the computing device to identify one or more semantic entities. In some implementations, the one or more semantic entities can be identified in response to a user request. The one or more semantic entities can be displayed on a display screen of the computing device. In some implementations, a user can select a semantic entity displayed on the display screen. The computing device can determine one or more supplemental information options associated with the selected semantic entity. In some implementations, the one or more supplemental information options can be determined based at least in part on a context of the audio signal obtained by the computing device or a context of the selected semantic entity. The computing device can display the one or more supplemental information options on the display screen.

With reference now to the FIGS., example embodiments of the present disclosure will be discussed in further detail.

FIG. 1 depicts an example system for identifying semantic entities within an audio signal according to example aspects of the present disclosure. The system 100 can include a computing device 102 (e.g., a mobile computing device such as a smartphone), a server computing system 130, and a peripheral device 150 (e.g., a speaker device).

The computing device 102 can include one or more processors 108 and a memory 110. The one or more processors 108 can be any suitable processing device (e.g., a processor core, a microprocessor, an ASIC, a FPGA, a controller, a microcontroller, etc.) and can be one processor or a plurality of processors that are operatively connected. The memory 110 can include one or more non-transitory computer-readable storage mediums, such as RAM, ROM, EEPROM, EPROM, flash memory devices, magnetic disks, etc., and combinations thereof. In some implementations, the memory can include temporary memory, such as an audio buffer, for temporary storage of audio signals. The memory 110 can store data 112 and instructions 114 which can be executed by the processor 108 to cause the user computing device 102 to perform operations.

The computing device 102 can also include one or more speakers 116. The one or more speakers 116 can be, for example, configured to audibly play audio signals (e.g., generate sounds waves include sounds, speech, etc.) for a user to hear. For example, an audio signal associated with a media file playing on the computing device 102 can be audibly played for a user by the one or more speakers 116. Similarly, an audio signal associated with a communication signal received by the computing device 102 (e.g., a telephone call) can be audibly played by the one or more speakers 116.

The computing device 102 can also include one or more display screens 118. The display screens 118 can be, for example, display screens configured to display various information to a user. In some implementations, the one or more display screens 118 can be touch-sensitive display screens capable of receiving a user input.

The computing device 102 can include one or more user interfaces 120. The user interfaces 120 can be used by a user to interact with the user computing device 102, such as to request semantic entities to be displayed or to request supplemental information on a particular semantic entity. The user interfaces 120 can be displayed on a display screen 118. Example user interfaces 120 according to example aspects of the present disclosure will be discussed in greater detail with respect to FIGS. 4-8.

The computing device 102 can also include one or more user input components 122 that receive user input. For example, the user input components 122 can be a touch-sensitive component (e.g., a touch-sensitive display screen 118 or a touch pad) that is sensitive to the touch of a user input object (e.g., a finger or a stylus). In some implementations, the user can perform a "swipe" gesture, such as touching a first part of a touch-sensitive display screen 118 and sliding their fingers along the display screen 118 to a second part of the display screen, in order to request the one or more semantic entities be displayed on the display screen 118, as described herein. In some implementations, the touch-sensitive component can serve to implement a virtual keyboard. Other example user input components 122 include one or more buttons, a traditional keyboard, or other means by which a user can provide user input. The user input components 122 can allow for a user to provide user input, such as via a user interface 120 or in response to information displayed in a user interface 120.

The computing device 102 can further include one or more microphones 124. The one or more microphones 124 can be, for example, any type of audio sensor and associated signal processing components configured to generate audio signals from ambient audio. For example, ambient audio, such as human speech, can be received by the one or more microphones 124, which can generate audio signals based on the ambient audio.

According to another aspect of the present disclosure, the computing device 102 can further include one or more machine-learned models 126. In some implementations, the machine-learned models 126 can be operable to analyze audio signals obtained by the computing device 102. For example, the computing device 102 can be configured to play various media files, and an associated audio signal can be analyzed by the one or more machine-learned models 126 to identify semantic entities, as disclosed herein. In some implementations, the one or more machine-learned models 126 can be, for example, neural networks (e.g., deep neural networks) or other multi-layer non-linear models which output semantic entities (e.g., data descriptive of the semantic entities) in response to audio signals. Example machine-learned models 126 according to example aspects of the present disclosure will be discussed below with further reference to FIGS. 2 and 3.

The computing device 102 can further include a communication interface 128. The communication interface 128 can include any number of components to provide networked communications (e.g., transceivers, antennas, controllers, cards, etc.). In some implementations, the computing device 102 includes a first network interface operable to communicate using a short-range wireless protocol, such as, for example, Bluetooth and/or Bluetooth Low Energy, a second network interface operable to communicate using other wireless network protocols, such as, for example, Wi-Fi, and/or a third network interface operable to communicate over GSM, CDMA, AMPS, 1G, 2G, 3G, 4G, 5G, LTE, GPRS, and/or other wireless cellular networks.

Referring still to FIG. 1, the system 100 can further include server computing system 130. The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

In some implementations, the server computing system 130 can store or include one or more machine-learned models. For example, the server computing system 130 can include one or more speech recognition semantic entity identifier models 140, one or more song recognition semantic entity identifier model 141, and/or one or more language translation semantic entity identifier models 142.

For example, the speech recognition semantic entity identifier model 140 can be trained to recognize semantic entities in audio signals including speech. For example, an audio signal, or a portion thereof, can be analyzed by the speech recognition semantic entity identifier model 140 to identify semantic entities present in the audio signal. In various implementations, the audio signal can be speech associated with an application being executed by a computing device, such as media playing on the computing device (e.g., a podcast), speech associated with a communication signal communicated to or from the computing device (e.g., a telephone call), and/or ambient audio received by the computing device, such as a conversation between two people. In some implementations, the audio signal can be analyzed by maintaining a copy of the audio signal (and/or data indicative of the audio signal) in an audio buffer of a memory 110 of the computing device. At least a portion of the audio signal can be input into the speech recognition semantic entity identifier model 140. A semantic entity (or a plurality of semantic entities) can then be received as an output of the speech recognition semantic entity identifier model 140. In some implementations, the audio signal and/or data indicative of the audio signal maintained in the audio buffer can be discarded following analysis, thereby helping to maintain bystander and user privacy.

The song recognition semantic entity identifier model 141 can be trained to recognize semantic entities in audio signals including songs. In various implementations, the audio signal can be a song associated with an application being executed by a computing device, such as a music streaming service application operating on the computing device (e.g., Pandora, Spotify, etc.), a song associated with a communication signal communicated to or from the computing device (e.g., a song transmitted over a telephone call or videoconference), and/or ambient audio received by the computing device, such as a song playing in a location where the computing device is located. For example, an audio signal, or a portion thereof, can be analyzed by the song recognition semantic entity identifier model 141 to identify songs, such as the song title and the artist singing the song. In some implementations, the audio signal can be analyzed by maintaining a copy of the audio signal (and/or data indicative of the audio signal) in an audio buffer of a memory 110 of the computing device. At least a portion of the audio signal can be input into the song recognition semantic entity identifier model 141. A semantic entity, such as the song title and artist can then be received as an output of the song recognition semantic entity identifier model 141.

The language translation semantic entity identifier model 142 can be trained to recognize semantic entities in audio signals including speech in a foreign language (i.e., a language other than a user's primary language). In various implementations, the audio signal can be speech associated with an application being executed by a computing device, such as media playing on the computing device (e.g., a podcast in a foreign language), speech associated with a communication signal communicated to or from the computing device (e.g., a telephone call), and/or ambient audio received by the computing device, such as a conversation between two people speaking different languages. In some implementations, the language translation semantic entity identifier model 142 can be trained to identify semantic entities in the foreign language, and output the semantic identities in the primary language. In some implementations, the audio signal can be analyzed by maintaining a copy of the audio signal (and/or data indicative of the audio signal) in an audio buffer of a memory 110 of the computing device. At least a portion of the audio signal can be input into the language translation semantic entity identifier model 142. A semantic entity (or a plurality of semantic entities) can then be received as an output of the language translation semantic entity identifier model 142. In some implementations, the audio signal and/or data indicative of the audio signal maintained in the audio buffer can be discarded following analysis, thereby helping to maintain bystander and user privacy.

Example machine-learned models, such a as speech recognition semantic entity identifier model 140, a song recognition semantic entity identifier model 141, and language translation semantic entity identifier model 142 according to example aspects of the present disclosure will be discussed in greater detail with respect to FIGS. 2 and 3.

The server computing system 130 can include a model trainer 146 that trains the one or more machine-learned models 140-142 using various training or learning techniques, such as, for example, backwards propagation of errors. In some implementations, performing backwards propagation of errors can include performing truncated backpropagation through time. The model trainer 146 can perform a number of generalization techniques (e.g., weight decays, dropouts, etc.) to improve the generalization capability of the models being trained.

In particular, the model trainer 146 can train the one or more machine-learned models 140-42 based on a set of training data 144. The training data 144 can include, for example, audio signals labelled with semantic entities. For example, a human reviewer can annotate various audio signals with semantic entity labels, which can be used as training data 144 for one or more of the machine-learned models 140-142.

In some implementations, the server computing device 130 can implement model trainer 146 to train new models or update versions on existing models on additional training data 144. As an example, the model trainer 146 can use audio signals hand-labeled with new semantic entities to train one or more machine-learned models 140-142 to provide outputs including the new semantic entities.

The server computing device 130 can periodically provide the computing device 102 with one or more updated versions of one or more models 140-142 included in the machine-learned models 126 stored on the computing device 102. The updated models 140-142 can be transmitted to the user computing device 102 via network 180.

The model trainer 146 can include computer logic utilized to provide desired functionality. The model trainer 146 can be implemented in hardware, firmware, and/or software controlling a general purpose processor. For example, in some implementations, the model trainer 146 includes program files stored on a storage device, loaded into a memory 134 and executed by one or more processors 132. In other implementations, the model trainer 146 includes one or more sets of computer-executable instructions that are stored in a tangible computer-readable storage medium such as RAM hard disk or optical or magnetic media.

In some implementations, any of the processes, operations, programs, applications, or instructions described as being stored at or performed by the server computing device 130 can instead be stored at or performed by the computing device 102 in whole or in part, and vice versa. For example, a computing device 102 can include a model trainer 146 configured to train the one or more machine-learned models 126 stored locally on the computing device 102.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Referring still to FIG. 1, system 100 can further include one or more peripheral devices 150. In some implementations, the peripheral device 150 can be an earbud device which can communicatively couple to the computing device 102.

The peripheral device 150 can include one or more user input components 152 that are configured to receive user input. The user input component(s) 152 can be configured to receive a user interaction indicative of a request. For example, the user input components 122 can be a touch-sensitive component (e.g., a touch pad) that is sensitive to the touch of a user input object (e.g., a finger or a stylus). The touch-sensitive component can serve to receive the user interaction indicative of the request, such as a "fetch" gesture (e.g., a pulldown motion), as described herein. Other example user input components 152 include one or more buttons, switches, or other means by which a user can provide user input. The user input components 152 can allow for a user to provide user input, such as to request one or more semantic entities be displayed.

The peripheral device 150 can also include one or more speakers 154. The one or more speakers 154 can be, for example, configured to audibly play audio signals (e.g., sounds, speech, etc.) for a user to hear. For example, an audio signal associated with a media file playing on the computing device 102 can be communicated from the computing device 102, such as over one or more networks 180, and the audio signal can be audibly played for a user by the one or more speakers 154. Similarly, an audio signal associated with a communication signal received by the computing device 102 (e.g., a telephone call) can be audibly played by the one or more speakers 154.

The peripheral device 150 can further include a communication interface 156. The communication interface 156 can include any number of components to provide networked communications (e.g., transceivers, antennas, controllers, cards, etc.). In some implementations, the peripheral device 150 includes a first network interface operable to communicate using a short-range wireless protocol, such as, for example, Bluetooth and/or Bluetooth Low Energy, a second network interface operable to communicate using other wireless network protocols, such as, for example, Wi-Fi, and/or a third network interface operable to communicate over GSM, CDMA, AMPS, 1G, 2G, 3G, 4G, 5G, LTE, GPRS, and/or other wireless cellular networks.

According to example aspects of the present disclosure, computing device 102 can be configured to display semantic entities to a user. For example, the computing device 102 can obtain an audio signal concurrently heard by a user. For example, the audio signal can include an audio signal associated with an application being executed by the computing device 102, such as media playing on the computing device 102, a communication signal communicated to the computing device 102 (e.g., a telephone call), an audio signal generated by a microphone 124 when ambient audio is received by the computing device 102, such as a conversation between a user and a third person, and/or other audio signals. The computing device 102 can then input the audio signal, or a portion thereof, into the machine-learned model(s) 126 to identify semantic entities in the audio signals. The semantic entities can be, for example, people, places, things, dates/times, events, or other semantically distinct entities.

The analysis of the audio signal can be performed in a background of the computing device 102, such as concurrently with another task being performed by the computing device 102. For example, analysis of an audio signal associated with media playing on the computing device 102 can be performed by the computing device 102 while the media plays. Stated differently, the analysis of the audio signal can be performed without interrupting the media playing or other task being performed on the computing device 102.

Further, the computing device 102 can then display the one or more semantic entities identified in the audio signal, such as on a display screen 118 of the computing device 102. For example, in various implementations, the one or more semantic entities can be displayed in a variety of ways, such as by displaying text, icons, pictures, etc. which are indicative of the semantic entities, and can be displayed in list format or via application-specific user interfaces 120. Example user interfaces 120 according to example aspects of the present disclosure will be discussed in greater detail with respect to FIGS. 4-8.

In some implementations, the one or more semantic entities can be displayed in response to receiving a user request. For example, in some implementations, a user can request the computing device 102 to display one or more semantic entities by performing a user interaction with the computing device 102 (e.g., performing a "swipe" gesture or accessing a "clipboard" application) or an associated peripheral device 150 (e.g., performing a "fetch" gesture).

In some implementations, upon receiving the user request, the computing device 102 can determine a selected portion of the audio signal for analysis based at least in part on a predetermined time period preceding receipt of the request from the user to identify the one or more semantic entities. For example, in some implementations, the computing device 102 can maintain a buffer in which an audio signal is temporarily stored as it is received (e.g., as a media file is played in an application, as a communication signal is received, or as an audio signal is generated by a microphone based on ambient audio). Upon receiving the user request, the computing device 102 can determine a selected portion of the audio signal for analysis based on a predetermined time period preceding receipt of the request from the user. For example, a portion of the audio signal can be selected according to a time at which the user request is received. In some implementations, the portion of the audio signal can be a portion of the audio signal prior to the time at which the user request is received. For example, the 10-15 seconds of audio signal preceding receipt of the user request can be selected as the selected portion of the audio signal for analysis. In some implementations, the analysis of the audio signal can be performed in response to receiving the user request, such as by analyzing only the selected audio portion by a machine-learned model 126 to determine the one or more semantic entities to display on the display screen 118. In other implementations, the entire audio signal (or a portion thereof) can been previously analyzed, such as on a rolling or continuous basis, and in response to receiving the user request, the semantic entities which have been identified within the selected audio portion can be displayed on the display screen 118.

In some implementations, a user can select a selected semantic entity from the one or more semantic entities displayed on the display screen 118 of the computing device 102. For example, in some implementations, a single semantic entity may be displayed at a time, and if a user performs a particular user interaction, such as touching the displayed semantic entity on a touch sensitive display screen 118, the user can select the semantic entity. In other implementations, a plurality of semantic entities can be displayed, such as in a list, and the user may select a particular semantic entity from the list. In various implementations, the user selection can be received by, for example, voice command, button push, user interface interaction, or other interaction indicative of a user selection.

In response to receiving the user selection of the selected semantic entity, the computing device 102 can determine one or more supplemental information options associated with the selected semantic entity. Further, the computing device 102 can display the one or more supplemental information options associated with the selected semantic entity on the display screen 118 of the computing device 102. In some implementations, the one or more supplemental information options can include database entries (e.g., webref entries, Wikipedia entries, etc.), search engine results (e.g., Google search results, etc.), and/or application interaction options (e.g., restaurant review applications, reservation applications, event ticket purchase applications, calendar applications, etc.).

In some implementations, the one or more supplemental information options can be determined based at least in part on the context of the audio signal obtained by the computing device 102 and/or a context of the selected semantic entity.

The context of the audio signal obtained by the computing device 102 can be, for example, the type of audio signal obtained by the computing device 102 and/or the manner in which it was obtained (e.g., telephone call, ambient audio, etc.). The context of the selected semantic entity can be for example, a categorization of the selected semantic entity, such as whether it is a person, a place, (e.g., restaurants, venues, tourist locations, etc.), a thing (e.g., product), a date and/or time, or other categorization. Example supplemental options determined based on a context of an audio signal or a context of a selected semantic entity will be discussed in greater detail with respect to FIGS. 4-8.

Figure 2:
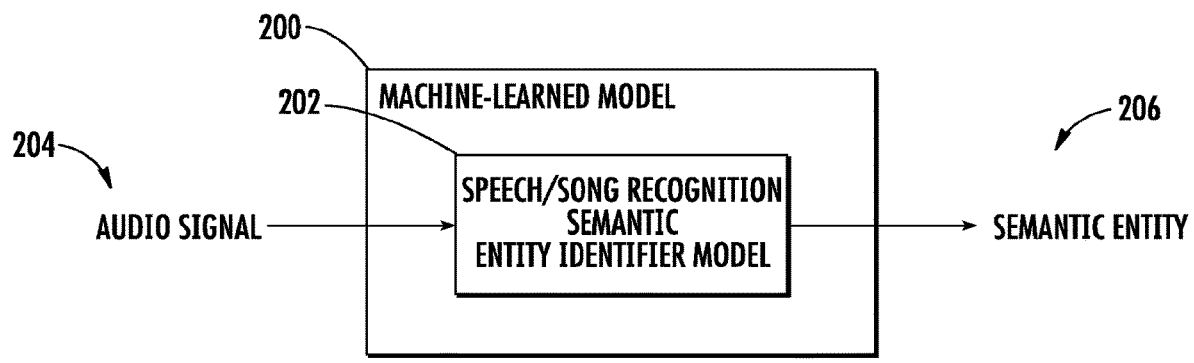
FIG. 2 depicts a block diagram of an example machine-learned speech recognition semantic entity identifier model according to example aspects of the present disclosure.

FIG. 2 depicts a block diagram of an example machine-learned model 200 according to example aspects of the present disclosure. In some implementations, the machine-learned model 200 can be stored on a computing device, such as a computing device 102 depicted in FIG. 1. The machine-learned 200 can be a machine-learned model configured to determine semantic entities 206 in an audio signal 204. In some implementations, the machine-learned model 200 is trained to receive an audio signal 204, which can be an audio signal 204 concurrently heard by a user. In some implementations, the machine-learned model 200 can include a machine-learned speech recognition semantic entity identifier model 202 that is operable to identify semantic entities in speech and/or a song recognition semantic entity identifier model 202 that is operable to identify semantic entities in songs. The speech/song recognition semantic entity identifier model 202 can correspond to, for example, a speech recognition semantic entity identifier model 140 and/or a song recognition semantic entity identifier model 141 depicted in FIG. 1. In some implementations, the speech/song recognition semantic entity identifier model 202 can be a neural network (e.g., deep neural network).

For example, the audio signal 204 can be an audio signal associated with an application being executed by the computing device. For example, an application executed on the computing device can be an application configured to play various media files, such as compressed and/or uncompressed media files. The media files can include an associated audio signal 204, which can be audibly played by the computing device for a user to hear (e.g., as a sound wave emitted from a speaker). The computing device can input the concurrently heard audio signal 204 into the machine-learned model 200, and receive one or more semantic entities 206. In various implementations, the audio signal 204 can first be converted, decoded, encoded, or otherwise processed to allow for the audio signal 204 to be input into the machine-learned model 200, such as data indicative of the audio signal 204. Thus, an audio signal 204 that is concurrently heard by a user (e.g., as a sound wave) need not be input into the machine-learned model 200 in the same format as the audio signal 204 heard by the user, but rather, the audio signal 204 can be processed as necessary to allow for the audio signal 204 to be input into the machine-learned model 200. Such processed audio signals 204 are intended to fall within the scope of the present disclosure.

In some implementations, the audio signal 204 can be an audio signal generated by a computing device based on ambient audio. For example, in some implementations, ambient audio can be received by a microphone of a computing device, and an audio signal 204 can be generated by processing or converting the ambient audio into the audio signal 204. The audio signal 204 generated based on the ambient audio can be converted, encoded, decoded, or otherwise processed as needed.

In some implementations, the audio signal 204 can be an audio signal associated with a communication signal communicated to or from a computing device. For example, in some implementations, a communication signal (e.g., a telephone call signal) can be received by the computing device, and an audio signal 204 associated with the communication signal can be input into the speech/song recognition semantic entity identifier model 202 to identify semantic entities 206 in the audio signal 204 associated with the communication signal. The audio signal 204 associated with the communication signal can be converted, encoded, decoded, or otherwise processed as needed.

In some implementations, an audio signal 204 can be temporarily stored in an audio buffer, and one or more portions of the audio signal 204 can be input into the machine-learned model 200. For example, in various implementations, the audio signal 204 can be analyzed as the audio signal 204 is received, such as on a rolling or continuous basis. In some implementations, a window of audio signal 204 can be analyzed. In some implementations, different portions of an audio signal 204, such as discrete portions, can be analyzed, such as sequentially. Following analysis of the audio signal 204, the audio signal 204 can be discarded.

One or more semantic entities 206 can be received as an output of the machine-learned model 200. For example, the semantic entities 206 identified by the machine-learned model 200 can be semantically distinct entities that respectively correspond to distinct semantic concepts. For example, each semantic entity can correspond to specific people, places, things, dates/times, events, or other semantically distinct concepts.

The semantic entities 206 can be received, for example, as data indicative of the semantic entities 206. Each semantic entity 206 can include or otherwise be represented by, for example, text labels, icons, pictures, etc. which can allow the semantic entity 206 to be displayed.

Figure 3:
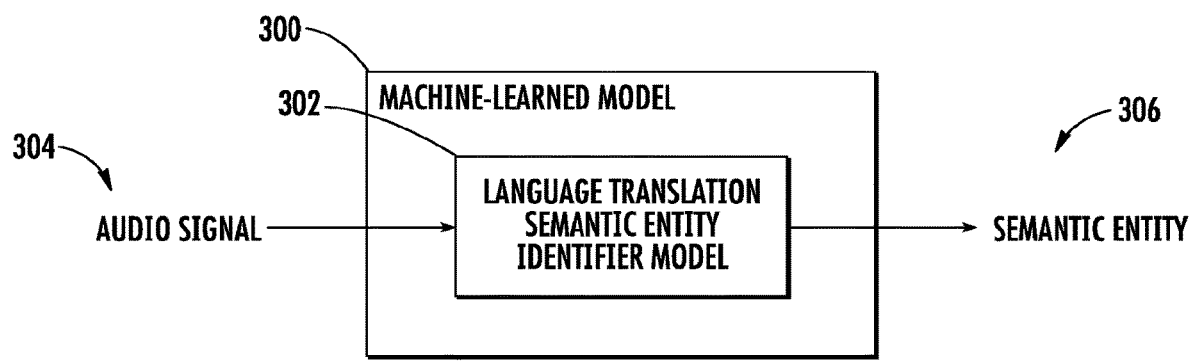
FIG. 3 depicts a block diagram of an example machine-learned language translation semantic entity identifier model according to example aspects of the present disclosure.

FIG. 3 depicts a block diagram of an example machine-learned model 300 according to example aspects of the present disclosure. In some implementations, the machine-learned model 300 can be stored on a computing device, such as a computing device 102 depicted in FIG. 1. The machine-learned 300 can be a machine-learned model configured to determine semantic entities 306 in an audio signal 304. In some implementations, the machine-learned model 300 is trained to receive an audio signal 304, which can be an audio signal 304 concurrently heard by a user. In some implementations, the machine-learned model 300 can include a machine-learned language translation semantic entity identifier model 302 that is operable to identify semantic entities in foreign speech. The language translation semantic entity identifier model 302 can correspond to, for example, a language translation semantic entity identifier model 142 depicted in FIG. 1. In some implementations, the language translation semantic entity identifier model 302 can be a neural network (e.g., deep neural network).

For example, the audio signal 304 can be an audio signal associated with an application being executed by the computing device. For example, an application executed on the computing device can be an application configured to play various media files, such as compressed and/or uncompressed media files. The media files can include an associated audio signal 304, which can be audibly played by the computing device for a user to hear (e.g., as a sound wave emitted from a speaker). The computing device can input the concurrently heard audio signal 304 into the machine-learned model 300, and receive one or more semantic entities 306. In various implementations, the audio signal 304 can first be converted, decoded, encoded, or otherwise processed to allow for the audio signal 304 to be input into the machine-learned model 300, such as data indicative of the audio signal 304. Thus, an audio signal 304 that is concurrently heard by a user (e.g., as a sound wave) need not be input into the machine-learned model 300 in the same format as the audio signal 304 heard by the user, but rather, the audio signal 304 can be processed as necessary to allow for the audio signal 304 to be input into the machine-learned model 300. Such processed audio signals 204 are intended to fall within the scope of the present disclosure.

In some implementations, the audio signal 304 can be an audio signal generated by a computing device based on ambient audio. For example, in some implementations, ambient audio can be received by a microphone of a computing device, and an audio signal 304 can be generated by processing or converting the ambient audio into the audio signal 304. The audio signal 304 generated based on the ambient audio can be converted, encoded, decoded, or otherwise processed as needed.

In some implementations, the audio signal 304 can be an audio signal associated with a communication signal communicated to or from a computing device. For example, in some implementations, a communication signal (e.g., a telephone call signal) can be received by the computing device, and an audio signal 304 associated with the communication signal can be input into the language translation recognition semantic entity identifier model 302 to identify semantic entities 306 in the audio signal 304 associated with the communication signal. The audio signal 304 associated with the communication signal can be converted, encoded, decoded, or otherwise processed as needed.

In some implementations, an audio signal 304 can be temporarily stored in an audio buffer, and one or more portions of the audio signal 304 can be input into the machine-learned model 300. For example, in various implementations, the audio signal 304 can be analyzed as the audio signal 304 is received, such as on a rolling or continuous basis. In some implementations, a window of audio signal 304 can be analyzed. In some implementations, different portions of an audio signal 304, such as discrete portions, can be analyzed, such as sequentially. Following analysis of the audio signal 304, the audio signal 304 can be discarded.

The language translation semantic entity identifier model 302 can be trained to identify semantic entities 306 from foreign speech. For example, a user may have a primary language the user speaks, but may converse with someone speaking a foreign language (i.e., a language other than the user's primary language). For example, the user may have an in-person conversation with a foreign language speaker while vacationing in a foreign country or have a telephone call with a foreign language speaker. The language translation semantic entity identifier model 302 can be trained to translate the foreign language audio signal into a primary language, and identify semantic entities 306 in the foreign language audio signal or the translated audio signal. For example, in some implementations, the language translation semantic entity identifier model 302 can be trained to first translate an audio signal 304 from a first language to a second language, and then identify one or more semantic entities 306 in the second language. In some implementations, the language translation semantic entity identifier model 302 can be trained to identify the one or more semantic entities 306 in an audio signal 304 in a first language, but output the semantic entities 306 in a second language. The semantic entities 306 identified by the language translation semantic entity identifier model 302 can be semantically distinct entities that respectively correspond to distinct semantic concepts. For example, each semantic entity can correspond to specific people, places, things, dates/times, events, or other semantically distinct concepts. In this way, the language translation semantic entity identifier model 302 can identify semantic entities 306 in an audio signal 304 which includes speech in a foreign language.

The semantic entities 306 can be received, for example, as data indicative of the semantic entities 306. Each semantic entity 306 can include or otherwise be represented by, for example, text labels, icons, pictures, etc. which can allow the semantic entity 306 to be displayed.

Referring generally to FIGS. 2 and 3, the machine-learned models 200/300 can operate in a background of a computing device, such as a computing device 102. For example, the analysis of audio signals 204/304 can be performed while the computing device 102 is concurrently performing another task (e.g., playing media via an application) or while the computing device is in an idle state (e.g., when a user's smartphone is locked). In some implementations, the machine-learned models 200/300 can be implemented on a first thread of a processor having multiple threads, and the concurrent task can be implemented on a second thread of the processor. In some implementations, the machine-learned models 200/300 can be implemented on a first processor of the computing device, and the concurrent task can be implemented on a second processor of the computing device. In this way, the machine-learned models 200/300 can operate in a background of the computing device.

Figure 4:
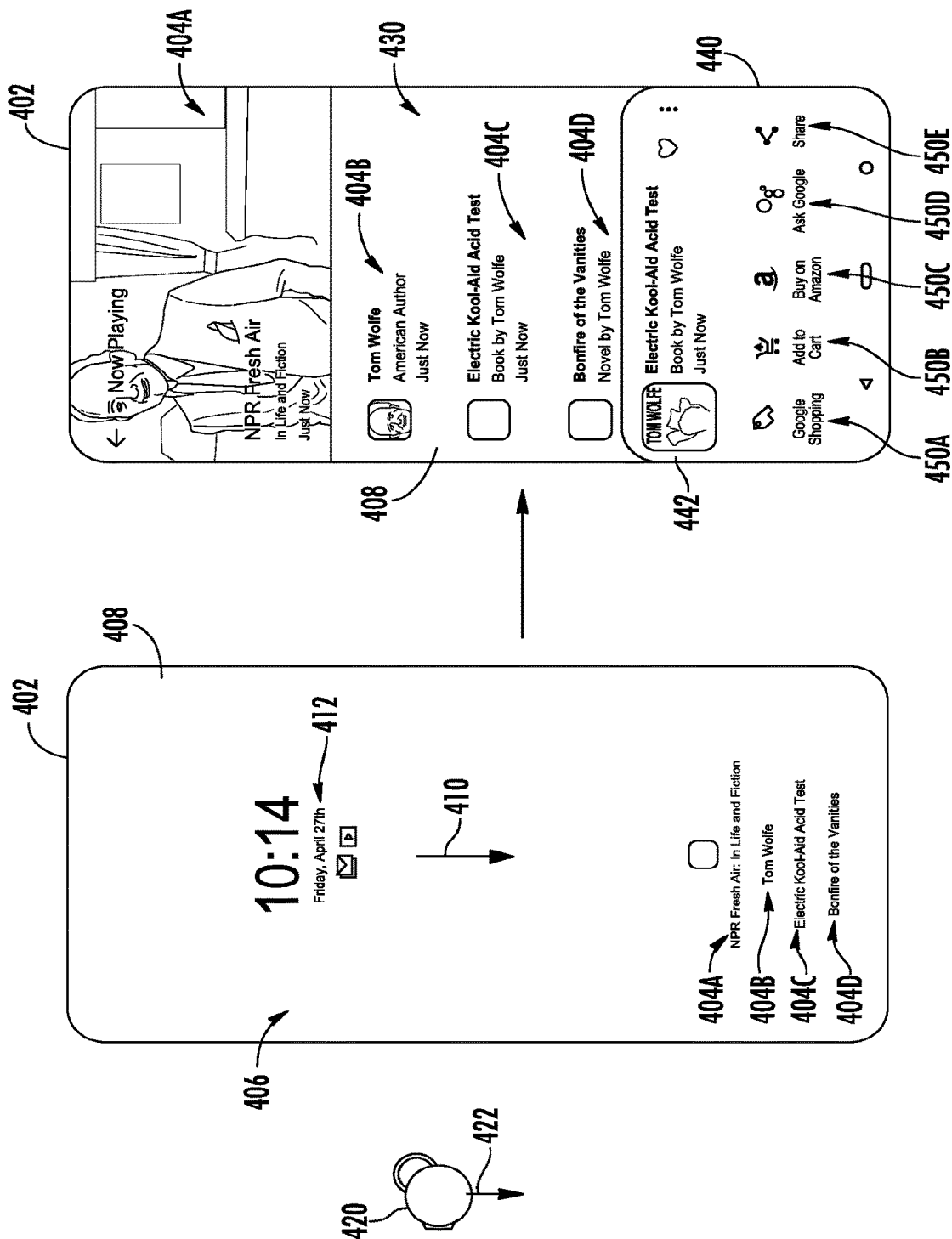
FIG. 4 depicts example user interactions and user interfaces for displaying one or more semantic entities and one or more supplemental information options on a computing device.

FIG. 4 depicts example user interactions and user interfaces for displaying one or more semantic entities and one or more supplemental information options on a computing device. The user interactions and user interfaces depicted are just some example user interactions and user interfaces for displaying one or more semantic entities and one or more supplemental information options. Other suitable user interfaces can similarly be used. In some implementations, the user interfaces depicted in FIG. 4 can be displayed on a computing device 102, such as a smartphone, laptop, or other personal computing device.

In some implementations, a computing device 402 can be configured to obtain an audio signal concurrently heard by a user by obtaining an audio signal associated with an application being executed by the computing device 402, an audio signal associated with a communication signal communicated to/from the computing device 402, or an audio signal generated based on ambient audio. For example, in some implementations, the computing device 402 can be a smartphone or other computing device in which media is playing on the computing device 402, such as a podcast. The computing device 402 can be configured to obtain audio signals associated with such signals, such as speech in the podcast. The computing device 402 can further analyze the audio signal using a machine-learned model, such as a speech recognition semantic entity identifier model, to identify semantic entities in the audio signal, as described herein.

Thus, in order to obtain the benefits of the techniques described herein, the user may be required to allow the collection and analysis of audio signals obtained by a user's computing device 402. For example, in some implementations, users may be provided with an opportunity to control whether programs or features collect such audio signals. If the user does not allow collection and use of such audio signals, then the user may not receive the benefits of the techniques described herein. The user can also be provided with tools to revoke or modify consent. In addition, certain information or data can be treated in one or more ways before it is stored or used, so that user information is protected. As an example, a computing device 402 can temporarily store such audio signals in an audio buffer for analysis, and discard the audio signals following analysis.

For example, as depicted in FIG. 4, several semantic entities 404 discussed in the content of a podcast episode have been recognized and are displayed on the computing device 402. For example, a computing device 402 can be configured to display one or more semantic entities 404 in a user interface 406. Computing device 402 can correspond to a computing device 102 depicted in FIG. 1, and as depicted in FIG. 4, the user interface 406 can be a user interface 406 displayed on a display screen 408 of the computing device 402. In some implementations, as shown in FIG. 4, the user interface 406 can be displayed on a "lock screen" of the computing device 402, such as a lock screen wherein the computing device 402 is idle or where an application is being executed on the computing device 402 but the computing device 402 is password protected. Further, as shown, a plurality of semantic entities 404 can be displayed on the user interface 406. For example, as shown, four semantic entities 404A-D are displayed in the user interface 406. Further, as shown, in some implementations, the semantic entities 404A-D can be displayed as text. In other implementations, the semantic entities 404A-D can be displayed as icons, pictures, etc. In some implementations, the first semantic entity 404A can be associated with a media file playing in an application being executed by the computing device 402, such as a title of a podcast.

In some implementations, the semantic entities 404A-D can be displayed in an order in which they are identified. For example, the semantic entities can be determined (i.e., identified) from an audio signal associated with an application being executed by the computing device 402, such as a podcast being concurrently played for a user through a speaker of the computing device 402. For example, a speech recognition semantic entity identifier model can recognize semantic entities in speech included in the audio signal. The audio signal associated with the podcast can be analyzed concurrently as the podcast is audibly played for the user. It should be noted that the computing device 402, or a processor thereof, can obtain the audio signal concurrently as the audio signal is played for the user through the application being executed by the computing device 402. The audio signal can then be analyzed by a machine-learned model in a background of the computing device 402, as disclosed herein. In some implementations, the analysis of the audio signal may require a time period to perform the analysis on the audio signal. For example, the audio signal may be analyzed in discrete portions, and the audio signal may not be analyzed until a particular portion has been audibly played to the user (e.g., at the end of a five second portion). Similarly, the audio signal may be analyzed in a streaming fashion, but the analysis may require processing time (e.g., 2-3 seconds). In some implementations, upon being identified, the one or more semantic entities 404A-D can be displayed. Thus, in some implementations, while there may be a delay between when an audio signal is audibly played for a user and when the one or more semantic entities 404A-D are displayed on a display screen 408, the audio signal heard by the user can be concurrently obtained by the computing device 402 as it is heard by the user. Further, the semantic entities 404A-D can be displayed on a display screen 408 of the computing device 402 once they have been determined, which can be essentially at the same time the user hears the audio signal or shortly thereafter in the case of a delay.

In some implementations, the semantic entities can be displayed for a particular length of time (e.g., five seconds). For example, each semantic entity can be displayed for the particular length of time, and at the end of the particular length of time, can be removed from the user interface 406. In some implementations, a plurality of semantic entities 404A-D can be displayed in a particular area of the user interface 406. For example, as shown, the four most recently determined semantic entities 404A-D can be displayed. As new semantic entities are determined, the new semantic entities can be displayed by replacing the oldest of the semantic entities 404A-D. For example, semantic entity 404A can be removed from the user interface, semantic entities 404B-D can be shifted upwards in the user interface 406, and a new semantic entity 404E (not shown) can be displayed in the user interface 406.

In some implementations, a first semantic entity 404A can be, for example, indicative of the audio signal being played for the user. For example, the first semantic entity 404A can be the title of the podcast playing on the computing device 402. The first semantic entity 404A can be identified by, for example, a title of the podcast file, and/or can be a semantic entity 404 identified using a machine-learned model, as disclosed herein. For example, a host can say the name of the podcast in the audio signal, which can be identified using a speech recognition semantic entity identifier model. Similarly, the one or more semantic entities 404B-D can be, for example, one or more semantic entities discussed in and identified from the actual content of the podcast (i.e., in the audio signal associated with the podcast).

The user interface 406 can include additional elements 412 which are displayed on the display screen 408. For example, as shown, the user interface 406 can include a field in which a time and date are displayed. Further, the user interface 406 can include icons which can provide additional information. For example, as shown, the first icon can indicate that a user has an unread email, and a second icon can indicate that an application is being executed in order to play media on the device, such as the podcast. Other icons which provide other information to a user can similarly be displayed in a user interface 406.

In some implementations, the one or more semantic entities 404A-D can be displayed absent a request. For example, the one or more semantic entities 404A-D can be automatically displayed on the display screen 408 without a user interacting with the computing device 402. For example, in some implementations, a user can configure certain settings on the computing device 402 such that when an application is being executed on the computing device 402, semantic entities 404A-D can be automatically displayed when they are determined from an audio signal concurrently played for the user.

In some implementations, the one or more semantic entities 404A-D can be displayed in response to receiving a request. For example, a user can request that the computing device 402 display the one or more semantic entities 404A-D, and the one or more semantic entities 404A-D can be displayed in response to receiving the request.

For example, in some implementations, a user can perform a user interaction with the computing device 402. For example, as shown in FIG. 4, a user can perform a "swipe" gesture 410 by touching a first portion of a touch sensitive display screen 408 with one or more fingers and swiping the one or more fingers to a second portion of the touch sensitive display screen 408. For example, the user can move his or her fingers in a downward motion of the touch sensitive display screen 408. The user interaction, such as the "swipe" gesture 410, can be a request for the computing device 402 to display the one or more semantic entities 404A-D on the display screen 408. Upon receiving the request, the computing device 402 can display the one or more semantic entities 404A-D, such as in a field of a user interface 406. In various implementations, other user interactions can similarly be used to provide a request, such as button presses, verbal requests, touching a particular field of the user interface 406, navigating through one or more user interfaces, opening a particular application, etc.

In some implementations the request can be received in response to a user performing a user interaction with an associated peripheral device, such as a peripheral device 150 depicted in FIG. 1. For example, in some implementations, the computing device 402 can be communicatively coupled to an associated peripheral device 420. In some implementations, the peripheral device 420 can be a speaker device, which can be configured to audibly play audio signals for a user. For example, an audio signal associated with an application executed on the computing device 402 can be communicated from the computing device 402 to the peripheral device 420, and a speaker of the peripheral device 420 can audibly play the audio signal for the user. For example, in some implementations, the peripheral device 420 can be an earbud device, such as an earbud device configured to wirelessly receive signals from the computing device 402, such as via a Bluetooth connection. The earbud device can be a wearable device configured to attach or be worn proximate to a user's ear. In various implementations, the peripheral device 420 can be configured to communicate with the computing device 420 via any suitable wired or wireless connection.

For example, in some implementations, a user request can be received in response to user performing a user interaction with the associated peripheral device 420. For example, the user interaction can be a "fetch" gesture 422 in which the user performs a pulldown motion on the peripheral device 420. Other user interactions with the associated peripheral device 420 can similarly be used to provide a request, such as button presses, etc. The peripheral device 420 can receive the request via the "fetch" gesture 422 (or other user interaction), and can communicate the request, such as via a wired or wireless connection, to the computing device 402. The computing device 402 can then display the one or more semantic entities 404A-D on the display screen 408 in response to receiving the request.

In some implementations, the computing device 402 can determine a portion of an audio signal to analyze based at least in part on receiving the user request. For example, the computing device 402 can select a portion of an audio signal according to a time at which the user request is received, such as when a user performs a "swipe" or "fetch" gesture. For example, the computing device 402 can select a portion of an audio signal prior to the time at which the user request is received. For example, the user can perform a user interaction (e.g., "swipe", "fetch") to request the computing device 402 to identify one or more semantic entities 404A-D within a portion of the audio signal, and the computing device 402 can select a portion of the audio signal from a time period before the user request was received. Stated differently, the computing device 402 can determine a selected portion of the audio signal for analysis based at least in part on a predetermined time period (e.g., 10 seconds) preceding receipt of the request from the user to display the one or more semantic entities 404A-D. The computing device 402 can then analyze the selected portion of the audio signal, identify the one or more semantic entities 404A-D in the portion of the audio signal, and operate the display screen 408 to display the one or more semantic entities 404A-D.

According to example aspects of the present disclosure, a user can select one or more semantic entities 404A-D. For example, a user can select one of the semantic entities 404A-D displayed on the display screen 408 of the computing device 402. In some implementations, the user can select a semantic entity 404A-D directly from the user interface 406. In some implementations, a user may open a secondary user interface 430 to make the selection.

For example, as depicted in FIG. 4, a user can touch a particular area of the user interface 406 (e.g., a field of the user interface 406 in which the semantic entities 404A-D are displayed) to open a secondary user interface 430. In some implementations, the secondary user interface 430 can be a user interface of an application being executed by the computing device 402, such as a podcast application, and the audio signal obtained by the computing device 402 can be an audio signal associated with the application.

For example, as shown in FIG. 4, the secondary user interface 430 can include the semantic entities 404A-D, such as in an expanded format in which additional information is displayed regarding each semantic entity 404A-D. For example, as shown in FIG. 4, first semantic entity 404A "NPR Fresh Air: In Life and Fiction" can be displayed in an upper portion of a secondary user interface 430 with an indication that the podcast is now playing in the podcast application, and that first semantic entity 404A was determined "Just Now." Further, second through fourth semantic entities 404B-D can be displayed in a middle portion of a secondary user interface 430, and additional information can similarly be displayed for each semantic entity. For example, second semantic entity 404B for "Tom Wolfe" can include information that Tom Wolfe is an American Author (e.g., a person), and that second semantic entity 404B was also determined "Just Now," third semantic entity 404C for "Electric Kool-Aid Acid Test" can include information that Electric Kool-Aid Acid Test is a book by Tom Wolfe (e.g., a particular book title by a particular author) and that third semantic entity 404C was determined "Just Now," and fourth semantic entity 404D for "Bonfire of the Vanities" can include information that Bonfire of the Vanities is a novel by Tom Wolfe (e.g., another particular book title by a particular author) and that the fourth semantic entity 404D was determined "Just Now."

A user can then select a particular semantic entity 404A-D, such as by touching a touch sensitive display screen 408 in an area where the semantic entity 404A-D is displayed. For example, as shown in FIG. 4, the user has selected the third semantic entity 404C for "Electric Kool-Aid Acid Test" as a selected semantic entity 442. Thus, in this way, a selected semantic entity 442 can be one of the semantic entities 404A-D displayed on a display screen 408 of the computing device 402.

According to additional aspects of the present disclosure, the computing device 402 can then determine one or more supplemental information options associated with the selected semantic entity 442. For example, as shown in a bottom portion 440 of a secondary user interface 430 in FIG. 4, the selected semantic entity 442 can be displayed along with one or more supplemental information options 450A-E. In some implementations, the supplemental information options 450A-E can be determined based at least in part on a context of the audio signal obtained by the computing device 402 or a context of the selected semantic entity 442.

In some implementations, the one or more supplemental information options 450 can be database entries associated with the selected semantic entity 442 (e.g., Wikipedia articles, webref entries, etc.), search results associated with the selected semantic entity 442 (e.g., Google search results), or one or more application interaction options associated with the selected semantic entity 442 (e.g., options to execute an associated application, such as purchase content or play media).

In some implementations, the one or more supplemental information options 450 can be determined based at least in part on the context of the audio signal obtained by the computing device 402 or a context of the selected semantic entity 442. For example, for selected semantic entities 442 which are tangible things capable of being purchased, one or more supplemental information options may include options to purchase the selected semantic entity 442. For example, as shown in FIG. 4, first supplemental information option 450A is an option to perform a Google shopping search (e.g., access a subset of search results), second supplemental information option 450B is an option to add the selected semantic entity to a cart to be purchased later, and third supplemental information option 450C is an option to purchase the selected semantic entity 442 on a vendor's website or through the vendor's application (e.g., Amazon). Fourth supplemental information option 450D can be an option to access Internet-based search results. Fifth supplemental information option 450E can be, for example, an option to share the selected semantic entity 442 with someone else, such as via text message, email, or other application.

In other implementations, other supplemental information options can similarly be provided based on a context of the audio signal or a context of the selected semantic entity 442. For example, other supplemental information options for a book could include links to a local library's website to search for the selected semantic entity, a map link to the local library, reviews of the particular book, etc. Similarly, if a user were to select the second semantic entity 404B for the author Tom Wolfe, supplemental information options may include a link to the author's website, an entry in a database for the author (e.g., a Wikipedia article), a list of upcoming speaking engagements for the author, etc.

Figure 5:
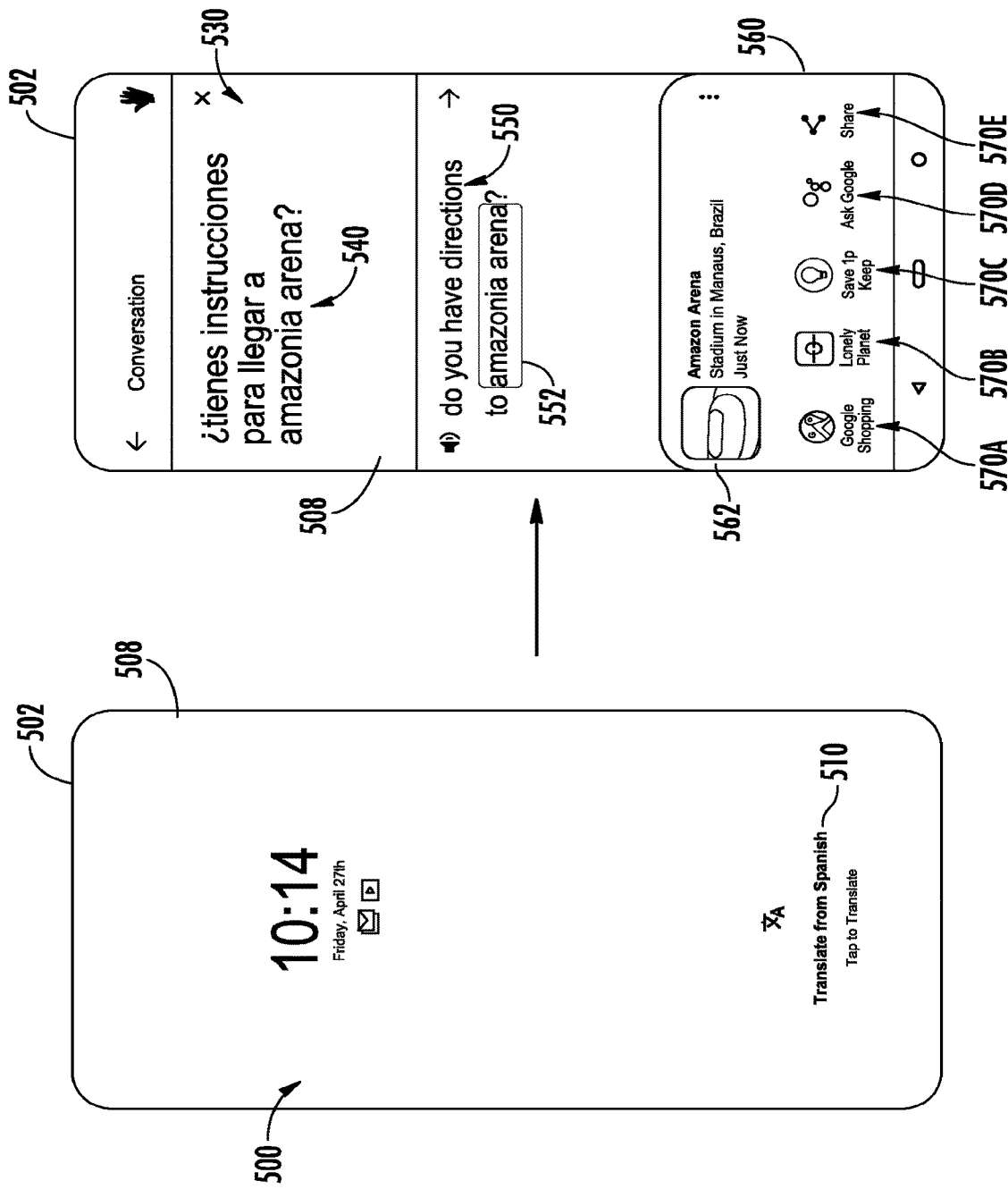
FIG. 5 depicts example user interfaces for displaying one or more semantic entities and one or more supplemental information options on a computing device.

FIG. 5 depicts example user interfaces for displaying one or more semantic entities and one or more supplemental information options on a computing device. The user interfaces depicted are just some example user interfaces for displaying one or more semantic entities and one or more supplemental information options. Other suitable user interfaces can similarly be used. In some implementations, the user interfaces depicted in FIG. 5 can be displayed on a computing device 102, such as a smartphone, laptop, or other personal computing device.

In some implementations, a computing device 502 can be configured to obtain an audio signal concurrently heard by a user by generating an audio signal based on ambient audio, such as by a microphone of the computing device 502, audio signals associated with an application being executed by the computing device 502, and/or audio signals associated with a communication signal communicated to/from the computing device 502. Computing device 502 can correspond to a computing device 102 depicted in FIG. 1. For example, in some implementations, a microphone or other sound sensor of a computing device 502 can be configured to receive ambient audio, such as sound waves from a conversation, and generate an audio signal based on the ambient audio. For example, a user having a conversation with a person in a foreign language may use their computing device 502 in order to translate speech from one language to another.

Thus, in some implementations, in order to obtain the benefits of the techniques described herein, the user may be required to allow the collection and analysis of audio signals obtained by his or her computing device 502. For example, in some implementations, users may be provided with an opportunity to control whether programs or features collect such audio signals. If the user does not allow collection and use of such audio signals, then the user may not receive the benefits of the techniques described herein. The user can also be provided with tools to revoke or modify consent. In addition, certain information or data can be treated in one or more ways before it is stored or used, so that user information is protected. As an example, a computing device 502 can temporarily store such audio signals in an audio buffer for analysis, and discard the audio signals following analysis.

In some implementations, a computing device 502 can be configured to display a user interface 506 on a display screen 508. In some implementations, as shown in FIG. 5, the user interface 506 can be displayed on a "lock screen" of the computing device 502, such as a lock screen wherein the computing device 502 is idle or where an application is being executed on the computing device 502 but the computing device 402 is password protected.

In some implementations, upon receiving an audio signal, such as an audio signal generated by a microphone based on ambient audio, the computing device 502 can determine that the audio signal includes speech in a foreign language. The foreign speech in the audio signal can be translated. For example, the computing device 502 can recognize that the audio signal includes speech in a language other than a user's primary language. In some implementations, a translation option 510 can be provided to a user to translate the speech in a foreign language to a primary language. For example, as depicted in FIG. 5, a user can request the foreign language be translated, and any semantic entities therein identified, by tapping the translation option 510 to translate the speech from a first language to speech in a second language, such as speech from a foreign language to a user's primary language. In other implementations, the foreign speech can be automatically translated without a request in an automatic translation mode.

As depicted in FIG. 5, upon tapping the translation option 510 or in the automatic translation mode, the foreign speech can be translated from the first language to the second image. For example, a secondary user interface 530 can be displayed on the display screen 508 of the computing device 502. As shown in an upper portion of the user interface 530, the speech received in the foreign language 540 (i.e., a first language) can be transcribed in the language in which it was received. Further, in a middle portion of the user interface 530, the translated speech 550 in the user's primary language (i.e., a second language) can be displayed.

In some implementations, one or more semantic entities 552 identified in the translated speech 550 can be indicated in the user interface 530. For example, as shown in FIG. 5, a semantic entity 552 identified within the translated speech 550 can be set off from the rest of the text by a box around the semantic entity 552. In other implementations, semantic entities 552 can be displayed in other suitable ways, such as different font size, font colors, underlining, italics, etc.

The user can select one or more of the semantic entities 552 displayed in the translated speech 550. For example, in a bottom portion 560 of a user interface 530, a selected semantic entity 562 can be displayed on a display screen 508 of the computing device 502.

According to additional aspects of the present disclosure, the computing device 502 can then determine one or more supplemental information options associated with the selected semantic entity 562. For example, as shown in a bottom portion 560 of a secondary user interface 530 in FIG. 5, the selected semantic entity 562 can be displayed along with one or more supplemental information options 570A-E. In some implementations, the supplemental information options 570A-E can be determined based at least in part on a context of the audio signal obtained by the computing device 502 or a context of the selected semantic entity 562.

In some implementations, the one or more supplemental information options 570 can be database entries associated with the selected semantic entity 562 (e.g., Wikipedia articles, webref entries, etc.), search results associated with the selected semantic entity 562 (e.g., Google search results), or one or more application interaction options associated with the selected semantic entity 562 (e.g., options to execute an associated application, such as open a mapping application to display a location).

In some implementations, the one or more supplemental information options 570 can be determined based at least in part on the context of the audio signal obtained by the computing device 502 or a context of the selected semantic entity 562. For example, as shown in FIG. 5, the selected semantic entity 562 is the Amazon Arena located in Manaus, Brazil. Further, as shown, a first supplemental information option 570A is an option to perform a Google shopping search (e.g., access a subset of search results), which can be specific to events occurring at the Amazon Arena (the selected semantic entity 562), second supplemental information option 570B is an option to access an entry about the selected semantic entity 562 in a travel application (e.g., Lonely Planet), third supplemental information option 570C is an option to save or store the selected semantic entity 562, such as to a list, fourth supplemental information option 570D is an option to access Internet-based search results (e.g. Google results), and fifth supplemental information option 570E can be an option to share the selected semantic entity 562 with someone else, such as via text message, email, or other application.

Figure 6:
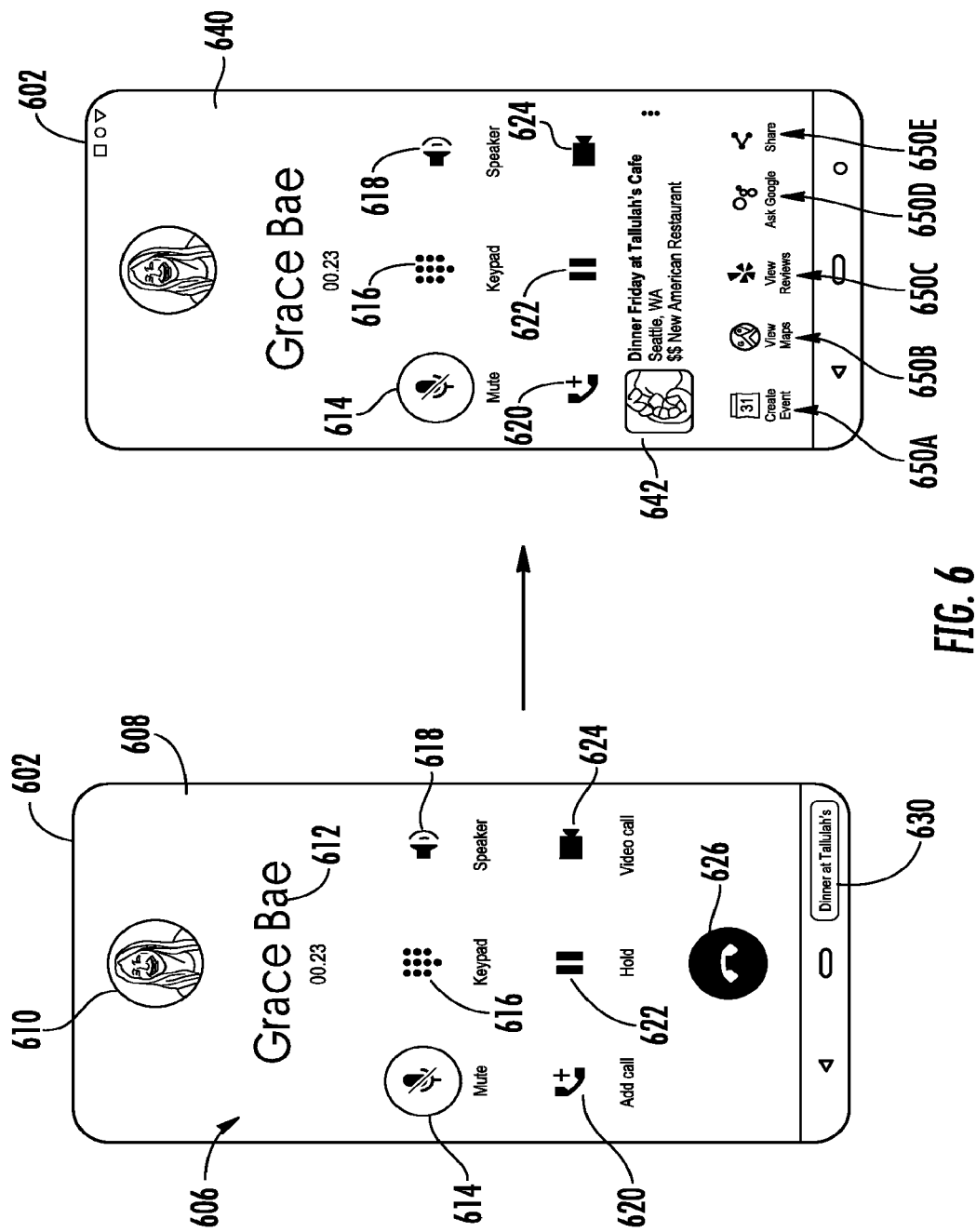
FIG. 6 depicts example user interfaces for displaying one or more semantic entities and one or more supplemental information options on a computing device.

FIG. 6 depicts example user interfaces for displaying one or more semantic entities and one or more supplemental information options on a computing device. The user interactions and user interfaces depicted are just some example user interfaces for displaying one or more semantic entities and one or more supplemental information options. Other suitable user interfaces can similarly be used. In some implementations, the user interfaces depicted in FIG. 6 can be displayed on a computing device 102, such as a smartphone, laptop, or other personal computing device.

In some implementations, a computing device 602 can be configured to obtain an audio signal concurrently heard by a user by obtaining an audio signal associated with an application being executed by the computing device 602, an audio signal generated based on ambient audio, or an audio signal associated with a communication signal communicated to or from the computing device 602. For example, in some implementations, the computing device 602 can be a smartphone or other computing device configured to allow the user to communicate with others. For example, the communication signal can be a telephone call, a video call, or other communication signal.

Thus, in order to obtain the benefits of the techniques described herein, the user may be required to allow the collection and analysis of audio signals obtained by the user's computing device 602. For example, in some implementations, users may be provided with an opportunity to control whether programs or features collect such audio signals. If the user does not allow collection and use of such audio signals, then the user may not receive the benefits of the techniques described herein. The user can also be provided with tools to revoke or modify consent. In addition, certain information or data can be treated in one or more ways before it is stored or used, so that user information is protected. As an example, a computing device 602 can temporarily store such audio signals in an audio buffer for analysis, and discard the audio signals following analysis.

In some implementations, a computing device 602 can be configured to display a user interface 606 on a display screen 608, such as a user interface 606 for a telephone call application. Computing device 602 can correspond to a computing device 102 depicted in FIG. 1. For example, the user interface 606 can include an icon 610 and a contact name 612 associated with the person to whom the user is communicating. Additional user interface 606 options can include, for example, a mute option 614 to mute the speaker, a keypad option 616 to access a keypad, such as a virtual keypad, a speaker option 618 to put the telephone call on speakerphone, an add call option 620 to initiate a conference call with additional people, a hold option 622 to place the call on hold, a video call option 624 to convert to a telephone call to a video call, and/or an end call option 626 to terminate the telephone call. Other suitable user interfaces 606 can similarly be used, which can include other telephone call options.

The computing device 602 can analyze an audio signal associated with a communication signal (e.g., the telephone call), and can identify semantic entities in the audio signal. For example, semantic entities can be identified in both speech from a user and speech from others on the telephone call. Upon identifying a semantic entity, the semantic entity can be displayed in the user interface 606. For example, during the course of a telephone conversation, one of the conversing parties may ask another if he/she would like to go to dinner at a particular restaurant and/or at a particular date/time. The audio signal associated with communication signal can be analyzed by one or more machine-learned models, as disclosed herein, and a semantic entity can be determined (i.e., identified) corresponding to the restaurant and/or the date and time. For example, as shown, a semantic entity 630 for "Dinner at Tallulah's" is displayed. In some implementations, the semantic entity 630 can be displayed in a particular field of the user interface 606 such as in a field located at a bottom portion of the user interface 606 as shown in FIG. 6. In some implementations, a "gleam" indicating a semantic identify has been identified can be displayed. The gleam can be, for example, an animation which is also displayed in the user interface 606 to indicate that one or more semantic entities have been identified. In some implementations, the semantic entity 630 can be displayed upon a user request, such as when the user taps on the gleam. The semantic entity 630 can then be displayed in the field in the user interface 606 instead of the gleam. In some implementations, the gleam can first be displayed and the semantic entity 630 can be displayed following the gleam absent a user request.

In some implementations, a user can select the semantic entity 630 by, for example, tapping the semantic entity 630. For example, a second user interface 640 can be displayed in the telephone application being executed on the computing device 602. The second user interface 640 can include, for example, various telephone call options 614-624 as displayed in user interface 606. Second user interface 640 can also include, for example, the selected semantic entity 642. Selected semantic entity 642 can include additional information, such as the name of the restaurant, the day of the proposed dinner, the city in which the restaurant is located, the type of cuisine served at the restaurant, an indication of the relative cost of dining at the restaurant, and/or other information. Further, one or more supplemental information options 650 can also be displayed in the user interface 640. For example, as shown in FIG. 6, five supplemental information options 650A-E are displayed.

In some implementations, the one or more supplemental information options 650 can be database entries associated with the selected semantic entity 642 (e.g., Wikipedia articles, webref entries, etc.), search results associated with the selected semantic entity 642 (e.g., Google search results), or one or more application interaction options associated with the selected semantic entity 642 (e.g., options to execute an associated application, such as create a calendar entry or open a mapping application to display a location).

In some implementations, the one or more supplemental information options 650 can be determined based at least in part on the context of the audio signal obtained by the computing device 602 or a context of the selected semantic entity 642. For example, as shown in FIG. 6, the selected semantic entity 642 is dinner Friday at Tallulah's Café. Further, as shown, a first supplemental information option 650A is an option to create a calendar event (e.g., add an event to a user's calendar application for the date, time, and/or location of the event), second supplemental information option 650B is an option to view the location of the restaurant in a map application (e.g., Google maps), third supplemental information option 650C is an option to view reviews on the restaurant, such as via a restaurant review application or website, fourth supplemental information option 650D is an option to access Internet-based search results (e.g. Google results), and fifth supplemental information option 650E can be an option to share the selected semantic entity 642 with someone else, such as via text message, email, or other application.

In other implementations, other supplemental information options can similarly be provided based on a context of the audio signal or a context of the selected semantic entity 642. For example, other supplemental information options for a restaurant could include a link to the restaurant's website, a link to a reservation application, a link to a menu for the restaurant, etc. Similarly, supplemental information options for a movie could include a link to the trailer for the movie, a link to a movie ticket purchase application, a link to a movie review website, a link to a list of show times at nearby theaters, an option to open a mapping application to get directions to a particular theater, etc.

Figure 7:
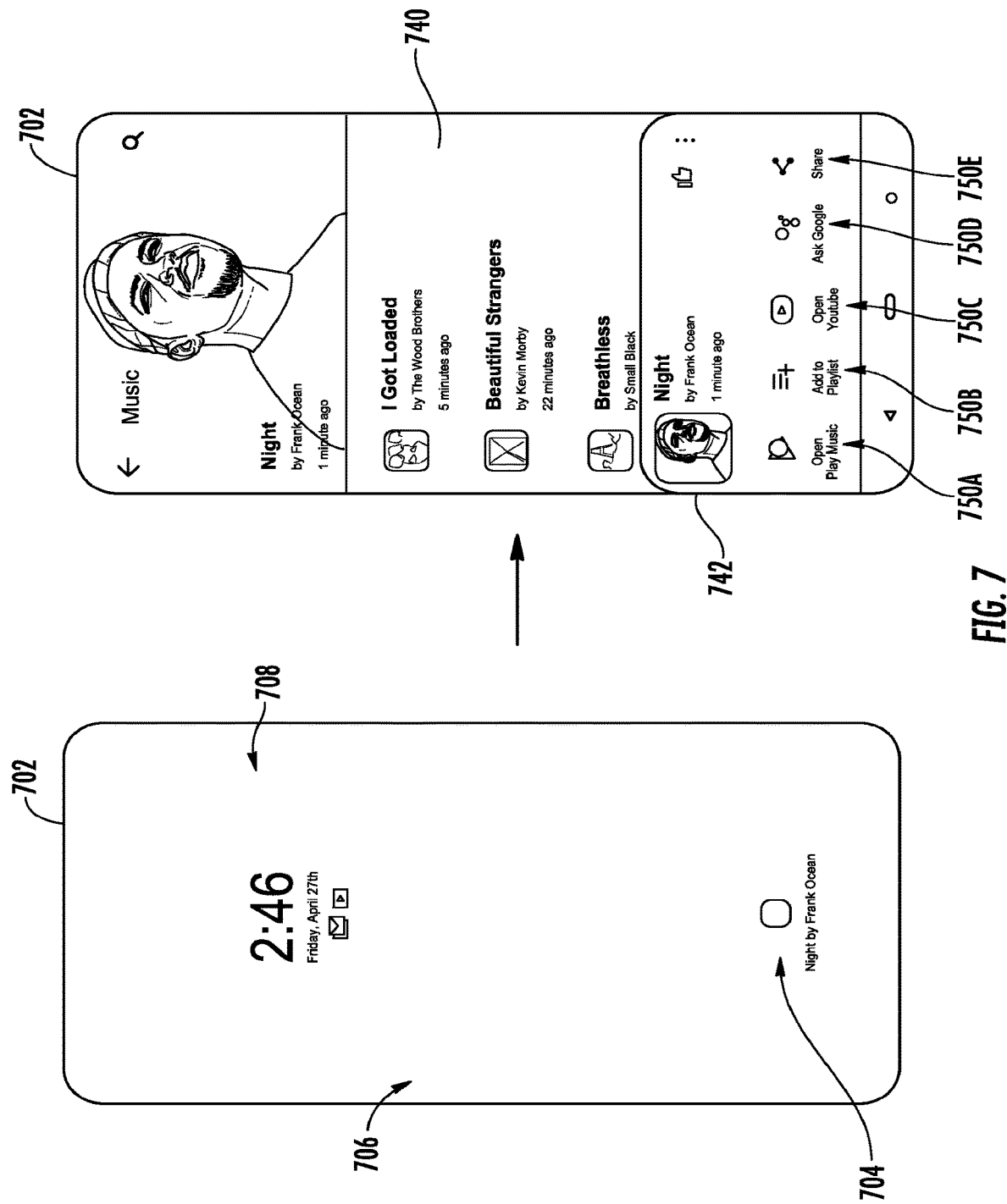
FIG. 7 depicts example user interfaces for displaying one or more semantic entities and one or more supplemental information options on a computing device.

FIG. 7 depicts example user interfaces for displaying one or more semantic entities and one or more supplemental information options on a computing device. The user interfaces depicted are just some example user interfaces for displaying one or more semantic entities and one or more supplemental information options. Other suitable user interfaces can similarly be used. In some implementations, the user interfaces depicted in FIG. 7 can be displayed on a computing device 102, such as a smartphone, laptop, or other personal computing device.

In some implementations, a computing device 702 can be configured to obtain an audio signal concurrently heard by a user by obtaining an audio signal associated with an application being executed by the computing device 702, an audio signal associated with a communication signal communicated to or from the computing device 702, or an audio signal generated based on ambient audio. For example, in some implementations, the computing device 702 can be a smartphone or other computing device in which media is playing on the computing device 702, such as a movie, or an audio signal in an environment in which the computing device 702 is located, such as a song playing in an elevator a user is riding, or an audio signal communicated to/from the computing device, such as a song played over a video call. The computing device 702 can be configured to obtain such audio signals. The computing device 702 can further analyze such audio signals using a machine-learned model, such as a song recognition semantic entity identifier model, to identify semantic entities in the audio signals, as described herein.

Thus, in order to obtain the benefits of the techniques described herein, the user may be required to allow the collection and analysis of audio signals obtained by a user's computing device 702. For example, in some implementations, users may be provided with an opportunity to control whether programs or features collect such audio signals. If the user does not allow collection and use of such audio signals, then the user may not receive the benefits of the techniques described herein. The user can also be provided with tools to revoke or modify consent. In addition, certain information or data can be treated in one or more ways before it is stored or used, so that user information is protected. As an example, a computing device 702 can temporarily store such audio signals in an audio buffer for analysis, and discard the audio signals following analysis.

In some implementations, a computing device 702 can be configured to display one or more semantic entities 704 in a user interface 706. Computing device 702 can correspond to a computing device 102 depicted in FIG. 1. For example, as depicted in FIG. 7, the user interface 706 can be a user interface 706 displayed on a display screen 708 of the computing device 702. In some implementations, as shown in FIG. 7, the user interface 706 can be displayed on a "lock screen" of the computing device 702, such as a lock screen wherein the computing device 702 is idle or where an application is being executed on the computing device 702 but the computing device 702 is password protected. Further, as shown, in some implementations, a semantic entity 704 can be displayed as text (e.g., a song title by an artist) and/or an icon/picture (e.g., a thumbnail picture of the artist).

For example, an identified semantic entity can be a song identified by the song recognition semantic entity identifier model, such as songs playing in applications executed by the computing device 702, songs communicated to/from the computing device 702, or songs overheard by the computing device 702 based on ambient audio. Upon identifying a semantic entity 704, the semantic entity 704 can be displayed in the user interface 706. For example, as shown in FIG. 7, a semantic entity 704 has been identified, and the semantic entity 704 has been displayed on the display screen 708. In some implementations, the semantic entity 704 can be displayed in a particular field of the user interface 706 such as in a field located at a bottom portion of the user interface 706 as shown in FIG. 7. In some implementations, a "gleam" indicating a semantic identify has been identified can be displayed. The gleam can be, for example, an animation which is also displayed in the user interface 706 to indicate that one or more semantic entities have been identified. In some implementations, the semantic entity 704 can be displayed upon a user request, such as when the user taps on the gleam. The semantic entity 704 can then be displayed in the field in the user interface 706 instead of the gleam. In some implementations, the gleam can first be displayed and the semantic entity 630 can be displayed following the gleam absent a user request.

In some implementations, a user can select the semantic entity 704 by, for example, tapping the semantic entity 704. For example, a second user interface 740 can be displayed on the computing device 702 upon the user selecting the semantic entity 704. Second user interface 740 can also include, for example, additional information about the selected entity 704, such as in an upper portion of the user interface 740 as depicted in FIG. 7. For example, a picture of the artist can be displayed, the song title, the artist name, and a time duration since the selected semantic entity 704 was identified can all be displayed in the user interface 740.

The user interface 740 can further include additional semantic entities previously identified by the computing device 702. For example, in a middle portion of the user interface 740, previously identified semantic entities can be displayed, such as previously identified songs, artists, and the time duration since the semantic entities were identified. The selected semantic entity 742 can be displayed, such as in a bottom portion of the user interface 740. The user interface 740 can further include one or more supplemental information options 750. For example, as shown in FIG. 7, five supplemental information options 750A-E are displayed.

In some implementations, the one or more supplemental information options 750 can be database entries associated with the selected semantic entity 742 (e.g., Wikipedia articles, webref entries, etc.), search results associated with the selected semantic entity 742 (e.g., Google search results), or one or more application interaction options associated with the selected semantic entity 742 (e.g., options to execute an associated application, such as opening an application to play the selected semantic entity).

In some implementations, the one or more supplemental information options 750 can be determined based at least in part on the context of the audio signal obtained by the computing device 702 or a context of the selected semantic entity 742. For example, as shown in FIG. 7, the selected semantic entity 742 is a particular song by a particular artist. Further, as shown, a first supplemental information option 750A is an option to play the song in a music application, second supplemental information option 750B is an option to add the song to a playlist, third supplemental information option 750C is an option to view a music video of the song, such as in a video application, fourth supplemental information option 750D is an option to access Internet-based search results (e.g. Google results), and fifth supplemental information option 750E can be an option to share the selected semantic entity 742 with someone else, such as via text message, email, or other application.

In other implementations, other supplemental information options can similarly be provided based on a context of the audio signal or a context of the selected semantic entity 742. For example, other supplemental information options for songs and/or artists may be to view upcoming tour dates and locations for the artist, access album reviews, visit the artist's website, access various music purchase options, such options to purchase as the individual song or the entire album from various vendors and in various formats, etc.

Figure 8:
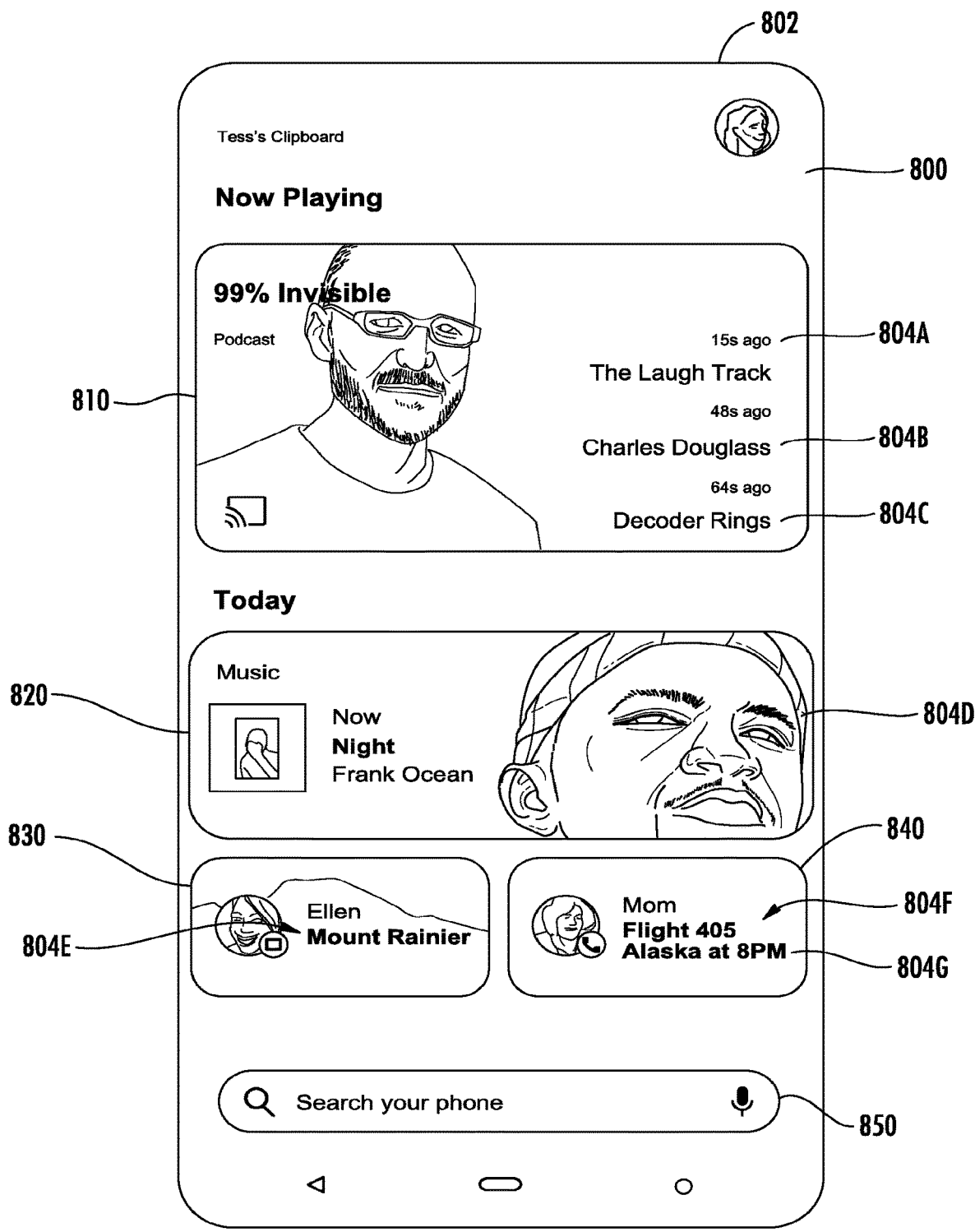
FIG. 8 depicts example user interfaces for displaying one or more semantic entities and one or more supplemental information options on a computing device.

FIG. 8 depicts an example user interface 800 for displaying one or more semantic entities on a computing device. The user interface 800 depicted in FIG. 8 is just one example user interface for displaying one or more semantic entities. Other suitable user interfaces can similarly be used. In some implementations, the user interface depicted in FIG. 8 can be displayed on a computing device 802, such as a smart phone, laptop, or other personal computing device, and can correspond to a computing device 102 depicted in FIG. 1.

User interface 800 depicts an example implementation of a "clipboard," which can be user interface displayed on the computing device 802 wherein semantic entities 804 which have been previously identified, such as over the course of the day, are displayed for the user's review. For example, in some implementations, semantic entities identified in audio signals can be logged (e.g., data indicative of the semantic entities can be stored locally on the computing device) to be accessed at a later time. For example, over the course of the day, a computing device 802 may identify a plurality of semantic entities 804, such as semantic entities 804 identified in telephone calls or other communications, semantic entities 804 associated with songs recognized by the computing device 802, semantic entities 804 identified in applications executed by the device, such as podcasts, music, or videos played on the computing device 802, or other semantic entities identified by the computing device 802. The semantic entities (or data indicative thereof) can be stored locally to be accessed at a later time. For example, a user can request that the plurality of semantic entities 804 be displayed by, for example, accessing, executing, or otherwise implementing the "clipboard" user interface 800. The user interface 800 can organize the plurality of semantic entities 804 and display the plurality of semantic entities 804 for a user's review.

For example, a first field 810 of the user interface 800 can display semantic entities 804A-C which have been identified in an application currently being executed on the computing device 802, such as a podcast playing on the computing device 802. A second field 820 can display a semantic entity 804D (or semantic entities), which can be one or more songs which have been recently recognized by the computing device 802. A third field 830 can display a semantic entity 804E (or semantic entities), which was identified in a first communication with a first person, and a fourth field 840 can display semantic entities 804F-G (or a single semantic entity), which were identified in a second communication with a second person. User interface 800 can further include a search field 850, wherein a user can search for particular semantic entities. In some implementations, a user can access additional information about semantic entities 804 displayed in a particular field 810/820/830/840. For example, a user can tap on a second field 820 to access a list of recognized songs, wherein a second user interface, such as a user interface depicted in FIG. 7, is displayed on the computing device 802. Additionally, other fields can be included in user interface 800.

Referring generally to FIGS. 4-8, the concept of determining one or more supplemental information options based at least in part on a context of an audio signal obtained by a computing device or a context of the selected semantic entity is illustrated. For example, the supplemental information options for a selected semantic entity can be determined based on the context of the audio signal, such as how it was received or a context of the semantic entity, such as a categorization of the selected semantic entity. For example, the supplemental information options 570A-E displayed in FIG. 5 are different from the supplemental information options 450A-E displayed in FIG. 4. For example, in FIG. 4, the selected semantic entity 442 is a tangible product available for purchase, so several of the supplemental information options 450 were directed towards options to purchase the related tangible product. However, in FIG. 5, the selected semantic entity 562 was a location/venue, so several information options 570 were directed towards options to purchase tickets at the venue or to learn more about the venue. Similarly, the context of the manner in which the audio signal was obtained can also be used to determine supplemental information options. For example, a semantic entity for a restaurant identified in a podcast may include different supplemental options (e.g., a link to a restaurant's website or Wikipedia article for the head chef) than the same semantic entity for the same restaurant identified in a telephone call (e.g., a calendar event for a particular reservation at the restaurant).

Figure 9:
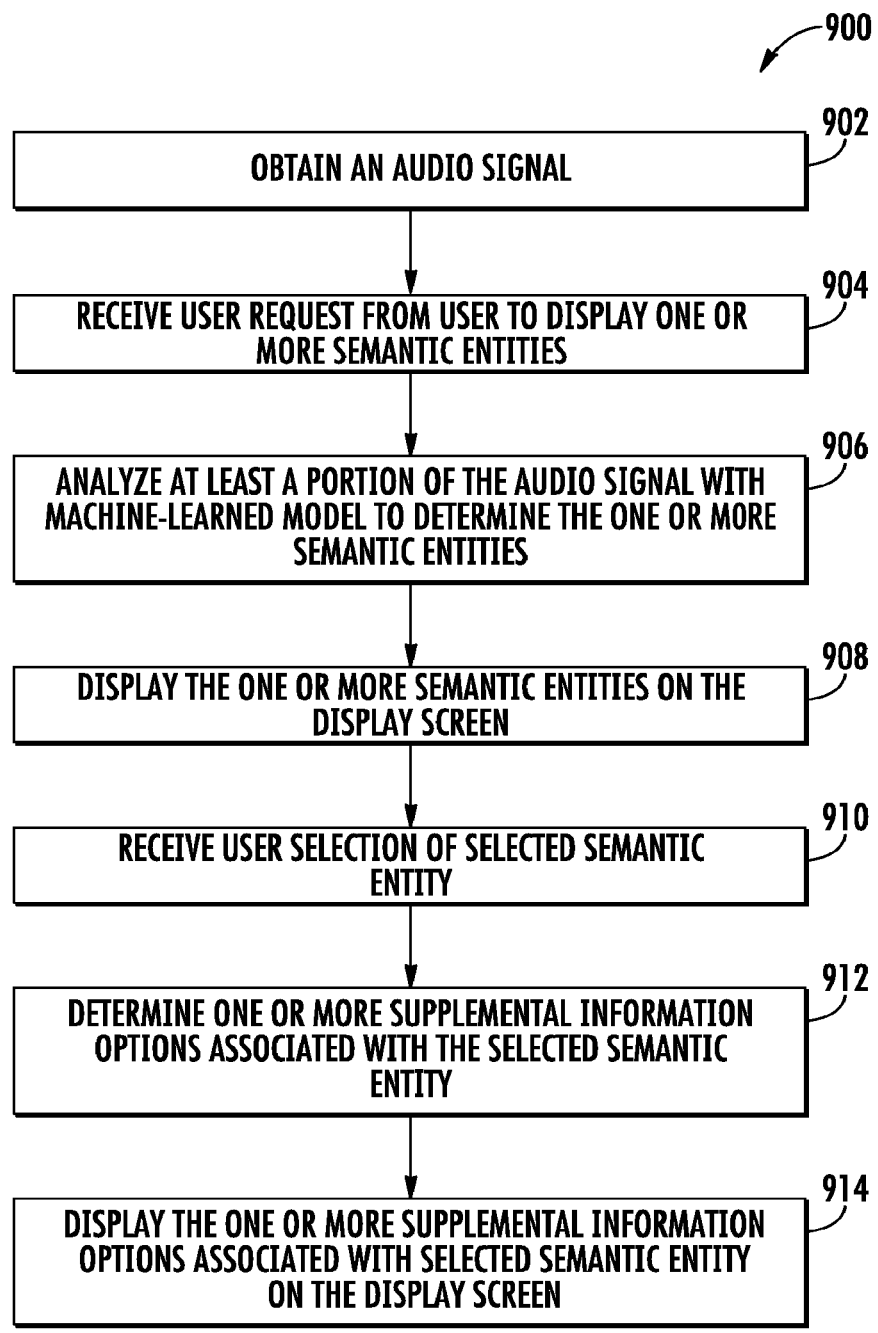
FIG. 9 depicts an example method for identifying semantic entities within an audio signal according to example aspects of the present disclosure.

FIG. 9 depicts a flow diagram of an example method (900) to identify semantic entities within an audio signal according to example aspects of the present disclosure. Method (900) can be implemented by a computing device, such as a computing device depicted in FIGS. 1 and 4-8. In addition, FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (902), the method (900) can include obtaining an audio signal. The audio signal can be an audio signal concurrently heard by a user. In some implementations, the audio signal can be an audio signal associated with an application being executed by the computing device, an audio signal generated by the computing device based on ambient audio, or an audio signal associated with a communication signal communicated to or from the computing device.

At (904), the method (900) can include receiving a request from a user to display one or more semantic entities. For example, in some implementations, the request can be received in response to a user performing a user interaction with an associated peripheral device. In some implementations, the associated peripheral device can be an earbud device communicatively coupled to the computing device. In some implementations, the user interaction can be a "fetch" gesture performed on the earbud device. In some implementations, the request can be a user interaction with the computing device. For example, in various implementations, a user can perform a "swipe" gesture on a lock screen of the computing device, or access a "clipboard" user interface on the computing device. In some implementations, the user request can be received by any suitable manner, such as by voice command, button press, etc.

At (906), the method (900) can include analyzing at least a portion of the audio signal with a machine-learned model to determine one or more semantic entities. The analysis of the audio signal can be performed in a background of the computing device. For example, the analysis can be performed concurrently with another application being executed by the computing device, or while the computing device is in an idle state. In some implementations, the machine-learned model can be a speech recognition semantic entity identifier model, a song recognition semantic entity identifier model, or a language translation semantic entity identifier model. In some implementations the machine-learned model can be used to analyze discrete portions of the audio signal. In some implementations, the machine-learned model can analyze a rolling window of the audio signal. The computing device can determine (i.e., identify) the one or more semantic entities by inputting the audio signal (or a portion thereof) into the machine-learned model and receiving the one or more semantic entities as an output of the machine-learned model.

In some implementations, a request to display the one or more semantic entities can be used to determine a selected portion of the audio signal for analysis. For example, in some implementations, a computing device can select a portion of the audio signal according to a time at which the request is received. Further, the portion of the audio signal can be a portion of the audio signal prior to the time at which the request was received. Stated differently, the computing device can determine a selected portion of the audio signal for analysis based at least in part on a predetermined time period preceding receipt of the request from the user to display the one or more semantic entities. The machine-learned model can then analyze the selected portion of the audio signal to determine the one or more semantic entities in the selected portion.

At (908) the method (900) can include displaying the one or more semantic entities on the display screen of the computing device. For example, various user interfaces, such as the user interfaces depicted in FIGS. 4-8, can display one or more semantic entities, such as in lists or in fields of the user interfaces. In some implementations, the one or more semantic entities can be displayed in response to receiving the request.

At (910), the method (900) can include receiving a user selection of a selected semantic entity. For example, a user can touch a touch-sensitive display screen of a computing device to select a particular semantic entity from a list of semantic entities. In some implementations, the user selection of the selected semantic entity can be when a user selects a single semantic entity displayed in a particular field of a user interface. In some implementations, the user selection can be received by any suitable manner, such as by voice command, button press, etc.

At (912), the method (900) can include determining one or more supplemental information options associated with the selected semantic entity. For example, in some implementations, the one or more supplemental information options can include database entries associated with the selected semantic entity (e.g., webref or Wikipedia entries), search results associated with the selected semantic entity (e.g., Google search results), or one or more application interaction options associated with the selected semantic entity (e.g., access a movie ticket purchase application). In some implementations, the one or more supplemental information options can be determined based at least in part on a context of the audio signal obtained by the computing device or a context of the selected semantic entity. For example, a categorization or type of the selected semantic entity can be used to determine supplemental information options for the selected semantic entity. Similarly, the type of audio signal and/or the manner in which the audio signal was received can be used to determine the one or more supplemental information options.

At (914), the method (900) can include displaying the one or more supplemental information options associated with the selected semantic entity on the display screen. For example, in some implementations, various user interfaces, such as the user interfaces depicted in FIGS. 4-8 can be used to display the one or more supplemental information options.

Figure 10:
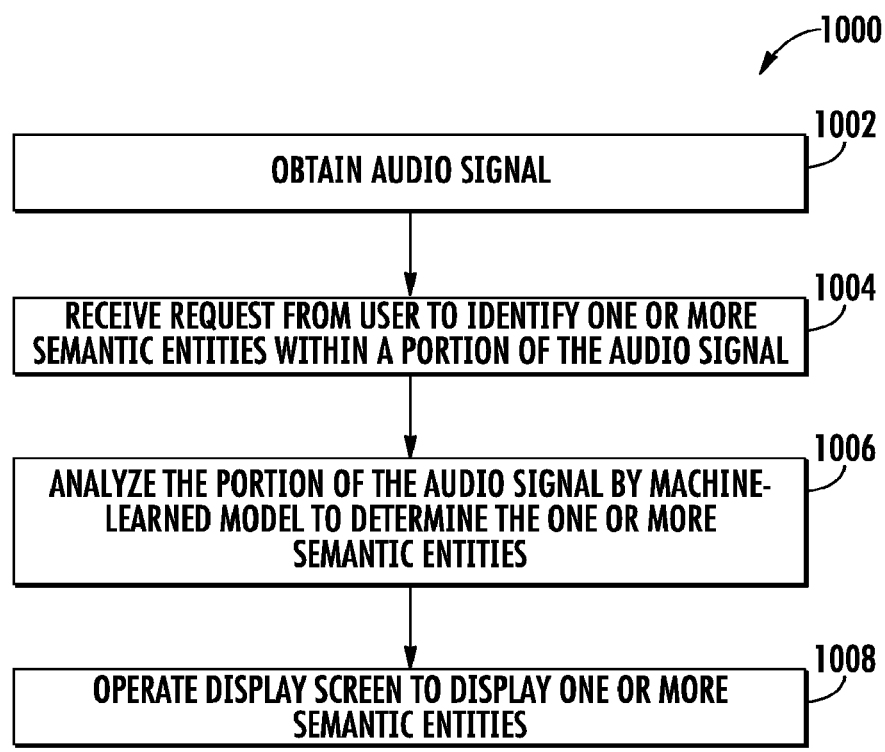
FIG. 10 depicts an example method for identifying semantic entities within an audio signal according to example aspects of the present disclosure.

FIG. 10 depicts a flow diagram of an example method (1000) to identify semantic entities within an audio signal according to example aspects of the present disclosure. Method (1000) can be implemented by a computing device, such as a computing device depicted in FIGS. 1 and 4-8. In addition, FIG. 10 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (1002), the method (1000) can include obtaining an audio signal. The audio signal can be an audio signal concurrently heard by a user. In some implementations, the audio signal can be an audio signal associated with an application being executed by the computing device, an audio signal generated by the computing device based on ambient audio, or an audio signal associated with a communication signal communicated to or from the computing device.

At (1004), the method (1000) can include receiving a request from a user to identify one or more semantic entities within a portion of the audio signal. For example, in some implementations, the request can be received in response to a user performing a user interaction with an associated peripheral device. In some implementations, the associated peripheral device can be an earbud device communicatively coupled to the computing device. In some implementations, the user interaction can be a "fetch" gesture performed on the earbud device. In some implementations, the request can be a user interaction with the computing device. For example, in various implementations, a user can perform a "swipe" gesture on a lock screen of the computing device, or access a "clipboard" user interface on the computing device. In some implementations, the user request can be received by any suitable manner, such as by voice command, button press, etc.

In some implementations, the request to identify the one or more semantic entities can be used to determine a selected portion of the audio signal for analysis. For example, in some implementations, a computing device can select a portion of the audio signal according to a time at which the request is received. Further, the portion of the audio signal can be a portion of the audio signal prior to the time at which the request was received. Stated differently, the computing device can determine a selected portion of the audio signal for analysis based at least in part on a predetermined time period preceding receipt of the request from the user to display the one or more semantic entities.

At (1006), the method (1000) can include analyzing the portion of the audio signal with a machine-learned model to determine one or more semantic entities. The analysis of the audio signal can be performed in a background of the computing device. For example, the analysis can be performed concurrently with another application being executed by the computing device, or while the computing device is in an idle state. In some implementations, the machine-learned model can be a speech recognition semantic entity identifier model, a song recognition semantic entity identifier model, or a language translation semantic entity identifier model. In some implementations the machine-learned model can be used to analyze discrete portions of the audio signal. In some implementations, the machine-learned model can analyze a rolling window of the audio signal. The computing device can determine (i.e., identify) the one or more semantic entities by inputting the portion of the audio signal into the machine-learned model and receiving the one or more semantic entities as an output of the machine-learned model.

At (1008) the method (1000) can include operating the display screen to display the one or more semantic entities. For example, various user interfaces, such as the user interfaces depicted in FIGS. 4-8, can display one or more semantic entities, such as in lists or in fields of the user interfaces.

Figure 11:
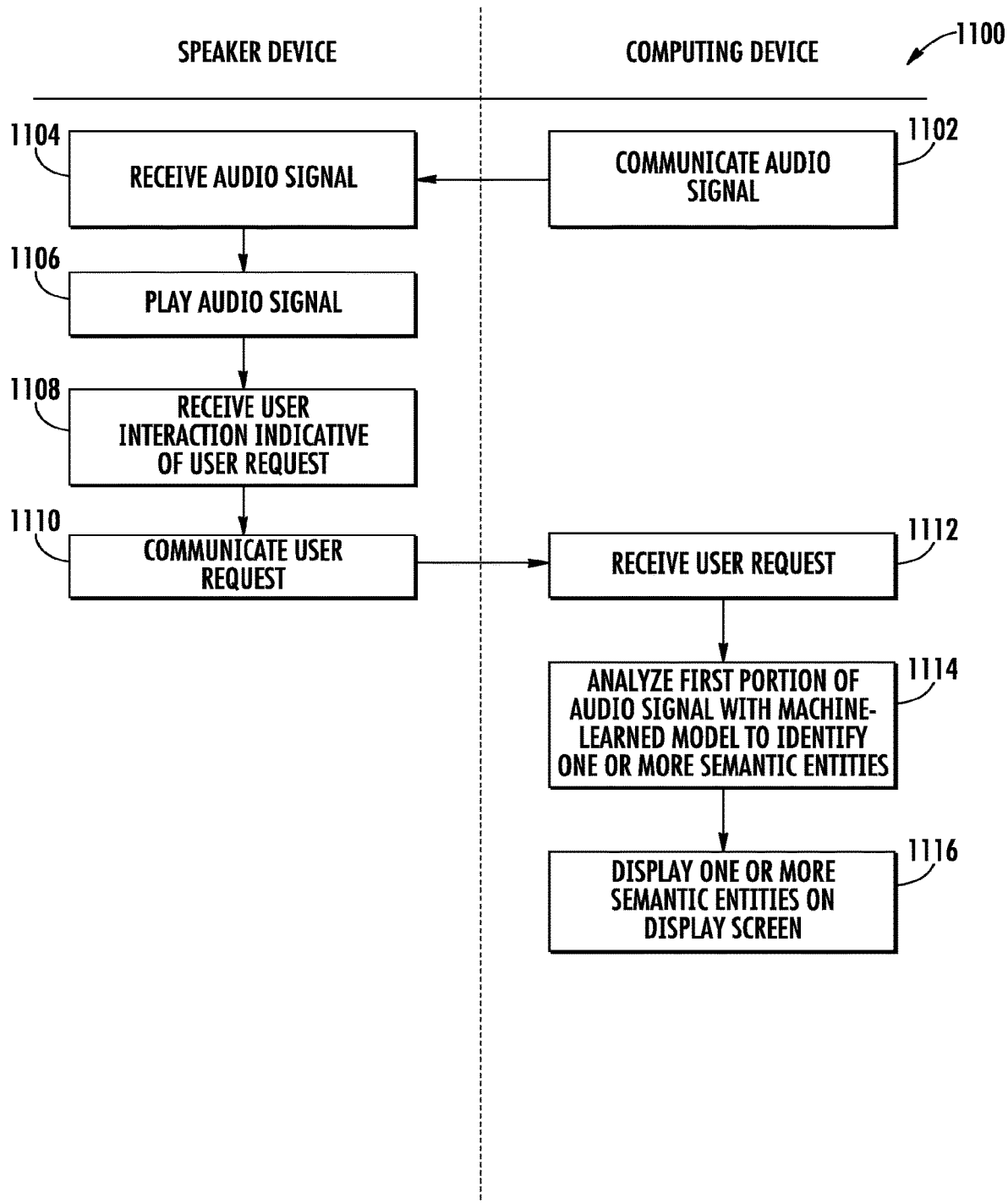
FIG. 11 depicts an example method for identifying semantic entities within an audio signal according to example aspects of the present disclosure.

FIG. 11 depicts a flow diagram of an example method (1100) to identify semantic entities within an audio signal according to example aspects of the present disclosure. Method (1100) can be implemented by a computing device, such as a computing device depicted in FIGS. 1 and 4-8, and an associated peripheral device, such as a peripheral device depicted in FIGS. 1 and 4. The associated peripheral device can be, for example, a speaker device, and more particularly, in some implementations, an earbud device. In addition, FIG. 1 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (1102), the method (1100) can include communicating an audio signal from the computing device to the speaker device. For example, the audio signal can be associated with media playing on the computing device, such as via an application being executed on the computing device. The computing device can be communicatively coupled to the speaker device, such as through a Bluetooth connection, and can communicate the audio signal associated with the media playing on the computing device (or other audio signal, as disclosed herein) from the computing device to the speaker device. At (1104), the speaker device can receive the audio signal from the computing device.

At (1106), the speaker device can play the audio signal. For example, the speaker device can audibly play the audio signal for the user.

At (1108), the speaker device can receive a user interaction indicative of a user request. For example, the user interaction can be a "fetch" gesture performed on an earbud device. In some implementations, the user interaction indicative of a user request can be received by any suitable manner, such as by voice command, button press, etc.

At (1110), the speaker device can communicate the user request to the computing device. For example, the speaker device can communicate the user request through a Bluetooth or other communication network. At (1112), the computing device can receive the user request from the speaker device.

At (1114), the computing device can analyze at least a portion of the audio signal with a machine-learned model to determine one or more semantic entities. The analysis of the audio signal can be performed in a background of the computing device. For example, the analysis can be performed concurrently with another application being executed by the computing device, or while the computing device is in an idle state. In some implementations, the machine-learned model can be a speech recognition semantic entity identifier model, a song recognition semantic entity identifier model, or a language translation semantic entity identifier model. In some implementations the machine-learned model can be used to analyze discrete portions of the audio signal. In some implementations, the machine-learned model can analyze a rolling window of the audio signal. The computing device can determine (i.e., identify) the one or more semantic entities by inputting the audio signal (or a portion thereof) into the machine-learned model and receiving the one or more semantic entities as an output of the machine-learned model.

In some implementations, a request to display the one or more semantic entities can be used to determine a selected portion of the audio signal for analysis. For example, in some implementations, a computing device can select a portion of the audio signal according to a time at which the request is received. Further, the portion of the audio signal can be a portion of the audio signal prior to the time at which the request was received. Stated differently, the computing device can determine a selected portion of the audio signal for analysis based at least in part on a predetermined time period preceding receipt of the request from the user to display the one or more semantic entities. The machine-learned model can then analyze the selected portion of the audio signal to determine the one or more semantic entities in the selected portion. In some implementations, the portion of the audio signal selected for analysis can include a portion of the audio signal played by the speaker device at a time period preceding receipt of the user interaction.

In some implementations, the computing device can include a microphone configured to generate audio signals based on ambient audio. The audio signal can be generated by the microphone, and a portion of the audio signal generated based on the ambient audio at a time period preceding receipt of the user interaction can be analyzed by the computing device. A user can similarly perform a user interaction indicative of a user request, as at (1108), which can be communicated to the computing device, as at (1110) and (1112). The computing device can then analyze at least a portion of the audio signal generated by the microphone, as at (1114).

At (1116), the one or more semantic entities can be displayed on the computing device. For example, various user interfaces, such as the user interfaces depicted in FIGS. 4-8, can display one or more semantic entities, such as in lists or in fields of the user interfaces.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Further, although the present disclosure is generally discussed with reference to computing devices, such as smartphones, the present disclosure is also applicable to other forms of computing devices as well, including, for example, laptop computing devices, tablet computing devices, wearable computing devices, desktop computing devices, mobile computing device, or other computing devices.

What is claimed is:

1. One or more non-transitory computer-readable media storing instructions that are executable by one or more processors to cause a computing system to perform operations, the operations comprising:
   obtaining a media file comprising one or more streaming audio signals configured for playing via a first application on a client device;
   analyzing, using a machine-learned model, at least a portion of the media file to determine a semantic entity referenced within the one or more streaming audio signals of the media file;
   obtaining one or more supplemental information options for the determined semantic entity, the one or more supplemental information options comprising at least one link selected from: a link to a web resource or a link to an application;
   outputting the one or more supplemental information options using a user interface of the client device for a particular length of time; and
   executing at least one of the one or more supplemental information options responsive to detecting a user interaction with the user interface associated with the at least one supplemental information option during the particular length of time.

2. The one or more non-transitory computer-readable media of claim 1, wherein the portion of the media file is analyzed concurrently with playback.

3. The one or more non-transitory computer-readable media of claim 1, wherein the one or more supplemental information options are output in association with playback of the media file.

4. The one or more non-transitory computer-readable media of claim 3, wherein the one or more supplemental information options are output during playback of the media file.

5. The one or more non-transitory computer-readable media of claim 3, wherein the operations comprise:
   presenting the one or more supplemental information options responsive to a user input associated with the determined semantic entity.

6. The one or more non-transitory computer-readable media of claim 5, wherein the user input comprises a selection of an input element corresponding to the determined semantic entity.

7. The one or more non-transitory computer-readable media of claim 6, wherein the input element is displayed temporarily on the user interface of the client device.

8. The one or more non-transitory computer-readable media of claim 1, wherein the determined semantic entity is a product or service, and wherein the at least one link initiates access to a shopping interface for purchasing the product or service.

9. The one or more non-transitory computer-readable media of claim 1, wherein the determined semantic entity is a product or service, and wherein the at least one link initiates execution of an application for purchasing the product or service.

10. A computing system, comprising:
    one or more processors; and
    one or more non-transitory computer-readable media storing instructions that are executable by the one or more processors to cause the computing system to perform operations, the operations comprising:

obtaining a media file comprising one or more streaming audio signals configured for playing via a first application on a client device;

analyzing, using a machine-learned model, at least a portion of the media file to determine a semantic entity referenced within the one or more streaming audio signals of the media file;

obtaining one or more supplemental information options for the determined semantic entity, the one or more supplemental information options comprising at least one link selected from: a link to a web resource or a link to an application;

outputting the one or more supplemental information options using a user interface of the client device for a particular length of time; and executing at least one of the one or more supplemental information options responsive to detecting a user interaction with the user interface associated with the at least one supplemental information option during the particular link of time.

11. The computing system of claim 10, wherein the portion of the media file is analyzed concurrently with playback.

12. The computing system of claim 10, wherein the one or more supplemental information options are output in association with playback of the media file.

13. The computing system of claim 12, wherein the one or more supplemental information options are output during playback of the media file.

14. The computing system of claim 12, wherein the operations comprise:

presenting the one or more supplemental information options responsive to a user input associated with the determined semantic entity.

15. The computing system of claim 14, wherein the user input comprises a selection of an input element corresponding to the determined semantic entity.

16. The computing system of claim 15, wherein the input element is displayed temporarily on the user interface of the client device.

17. The computing system of claim 10, wherein the determined semantic entity is a product or service, and wherein the at least one link initiates access to a shopping interface for purchasing the product or service.

18. The computing system of claim 10, wherein the determined semantic entity is a product or service, and wherein the at least one link initiates execution of an application for purchasing the product or service.

19. A method, comprising:

obtaining, by a computing system comprising one or more processors, a media file comprising one or more streaming audio signals configured for playing via a first application on a client device;

analyzing, by the computing system and using a machine-learned model, at least a portion of the media file to determine a semantic entity referenced within the one or more streaming audio signals of the media file;

obtaining, by the computing system, one or more supplemental information options for the determined semantic entity, the one or more supplemental information options comprising at least one link selected from: a link to a web resource or a link to an application;

outputting, by the computing system and in association with playback of the media file, the one or more supplemental information options using a user interface of the client device for a particular length of time; and executing, by the computing system, at least one of the one or more supplemental information options responsive to detecting a user interaction with the user interface associated with the at least one supplemental information option during the particular length of time.

20. The method of claim 19, wherein the one or more supplemental information options are output during playback of the media file.

* * * * *